(12) United States Patent
Matsuoka

(10) Patent No.: US 11,019,348 B2
(45) Date of Patent: May 25, 2021

(54) IMAGE PROCESSING APPARATUS AND IMAGE PROCESSING METHOD

(71) Applicant: CANON KABUSHIKI KAISHA, Tokyo (JP)

(72) Inventor: Masaaki Matsuoka, Yokohama (JP)

(73) Assignee: CANON KABUSH1KI KAISHA, Tokyo (JP)

( * ) Notice: Subject to any disclaimer, the term of this patent is extended or adjusted under 35 U.S.C. 154(b) by 0 days.

(21) Appl. No.: 16/178,814

(22) Filed: Nov. 2, 2018

(65) Prior Publication Data

US 2019/0141343 A1    May 9, 2019

(30) Foreign Application Priority Data

Nov. 6, 2017 (JP) .............................. JP2017-214188

(51) Int. Cl.
| *H04N 19/169* | (2014.01) |
| *H04N 19/63* | (2014.01) |
| *H04N 19/186* | (2014.01) |
| *H04N 13/282* | (2018.01) |
| *H04N 19/124* | (2014.01) |
| *H04N 19/513* | (2014.01) |
| *H04N 13/128* | (2018.01) |
| *H04N 19/597* | (2014.01) |

(52) U.S. Cl.
CPC ....... *H04N 19/1883* (2014.11); *H04N 13/128* (2018.05); *H04N 13/282* (2018.05); *H04N 19/124* (2014.11); *H04N 19/186* (2014.11); *H04N 19/513* (2014.11); *H04N 19/597* (2014.11); *H04N 19/63* (2014.11)

(58) Field of Classification Search
CPC .. H04N 19/124; H04N 19/186; H04N 19/513; H04N 19/597; H04N 19/63; H04N 13/128; H04N 13/282
See application file for complete search history.

(56) References Cited

U.S. PATENT DOCUMENTS

| 2008/0089406 A1* | 4/2008 | Fukuhara ........... H04N 21/4325 375/240.01 |
| 2013/0222553 A1* | 8/2013 | Tsuchita ............ H01L 27/14627 348/49 |

FOREIGN PATENT DOCUMENTS

JP    2015-171097 A    9/2015

* cited by examiner

*Primary Examiner* — Dakshesh D Parikh
(74) *Attorney, Agent, or Firm* — Cowan, Liebowitz & Latman, P.C.

(57) ABSTRACT

An image processing apparatus divides a plurality of difference images that are based on addition and subtraction between a plurality of parallax images, and a second difference image between a current composite image that is based on addition of the plurality of parallax images and a past composite image, into a plurality of sub-bands. As for the plurality of first difference images, the image processing apparatus then encodes data of a sub-band that includes high-frequency components, out of the plurality of sub-bands. As for the second difference image, the image processing apparatus encodes data of the plurality of sub-bands.

24 Claims, 13 Drawing Sheets

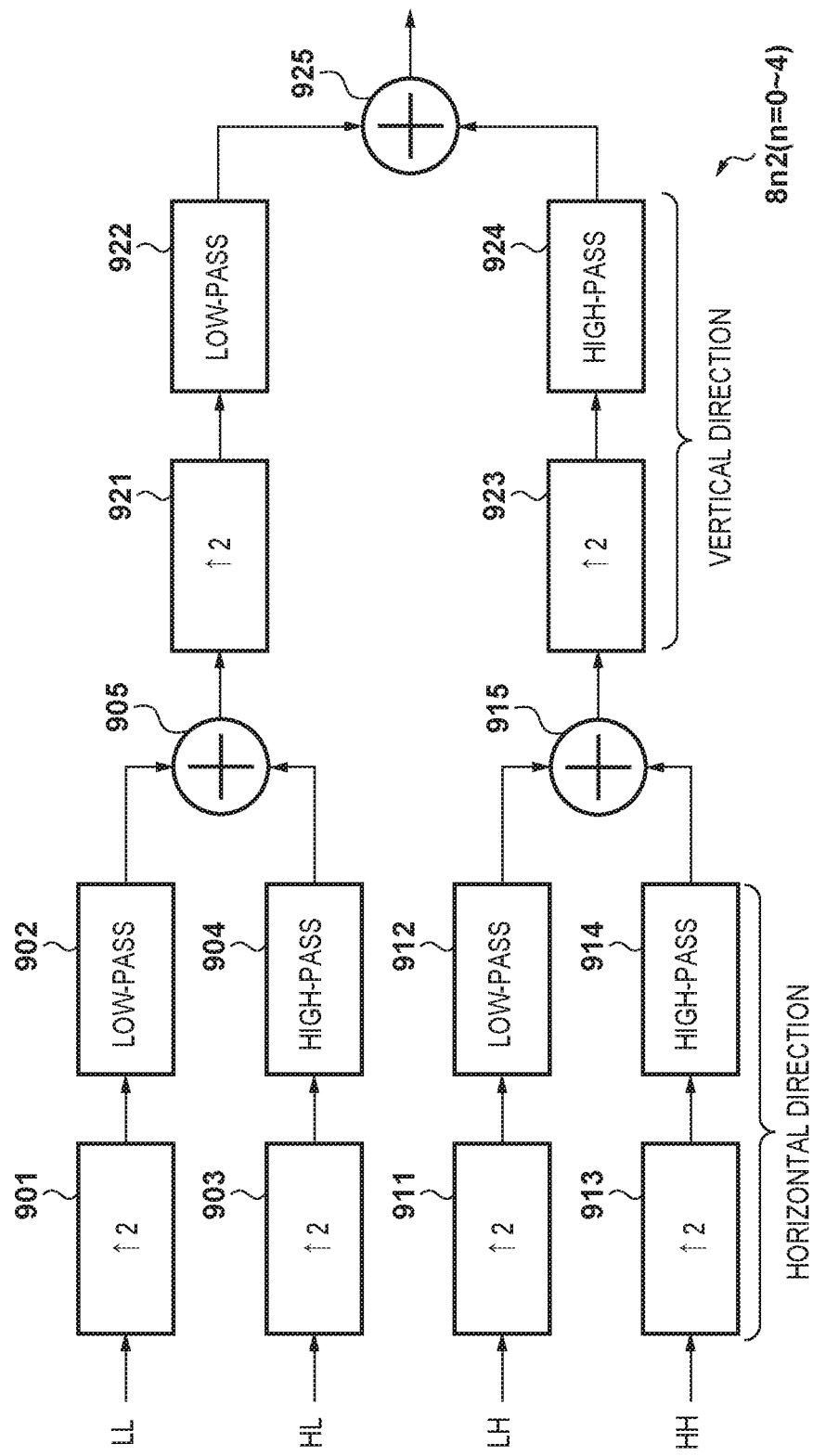

IMAGE PROCESSING APPARATUS AND IMAGE PROCESSING METHOD

BACKGROUND OF THE INVENTION

Field of the Invention

The present invention relates to an image processing apparatus and an image processing method, and relates particularly to an image processing technique associated with multi-viewpoint images.

Description of the Related Art

Images (multi-viewpoint images) that are obtained by capturing images of the same subject from a plurality of viewpoints, such as those obtained through stereoscopic photographing or multi-angle photographing, are used to provide stereoscopic vision or to generate an image from a changed viewpoint or in-focus distance, for example. Since multi-viewpoint images are a group of images with the same number of frames as that of viewpoints, the amount of data thereof also increases with an increase in the number of viewpoints.

Japanese Patent Laid-Open No. 2015-171097 discloses that, instead of transmitting all data of a plurality of images (sub-images) that constitute multi-viewpoint images, data of an image obtained by calculating an arithmetic average of the sub-images and data of a region of interest (ROI) within each of the sub-images are transmitted.

The technique disclosed in Japanese Patent Laid-Open No. 2015-171097 can realize refocusing in the ROI while reducing the amount of data to be transmitted. However, the image region that can be subjected to refocusing is limited to the ROI.

SUMMARY OF THE INVENTION

The present invention provides a technique for reducing the amount of data of multi-viewpoint images while ensuring flexibility in image processing using the multi-viewpoint images.

According to one aspect of the present invention, there is provided an image processing apparatus comprising: a processor that executes a program stored in a memory and functions as: a dividing unit configured to divide a plurality of first difference images that are based on addition and subtraction of a plurality of parallax images, and a second difference image between a current composite image that is based on addition of the plurality of parallax images and a past composite image, into a plurality of sub-bands including a sub-band that includes high-frequency components and a sub-band that does not include high-frequency components; and an encoding unit configured to encode the plurality of first difference images and the second difference image, wherein, as for the plurality of first difference images, the encoding unit encodes data of the sub-band that includes high-frequency components, and, as for the second difference image, the encoding unit encodes data of the plurality of sub-bands.

According to another aspect of the present invention, there is provided an image processing apparatus comprising: a processor that executes a program stored in a memory and functions as: an acquisition unit configured to acquire first encoded data obtained by encoding a plurality of sub-bands of a difference image between a current composite image that is based on addition of a plurality of parallax images and a past composite image, and second encoded data obtained by encoding a sub-band that includes high-frequency components, out of the plurality of sub-bands, of each of a plurality of difference images that are based on addition and subtraction of the plurality of parallax images; a first addition unit configured to add a composite image that was restored in the past to encoded data of a sub-band that does not include high-frequency components, out of the first encoded data, to restore a composite image; a second addition unit configured to add a composite image that was restored in the past to encoded data of a sub-band that includes high-frequency components, out of the first encoded data, to restore a composite image; a restoration unit configured to restore the plurality of parallax images, using the composite image restored by the second addition unit and the plurality of difference images restored using the second encoded data; a generation unit configured to generate a refocused image using the plurality of restored parallax images; and a third addition unit configured to add the refocused image to the composite image that has been restored by the first addition unit.

According to still another aspect of the present invention, there is provided an image capture apparatus comprising: an image sensor that receives a light beam from an optical system and outputs a plurality of parallax images; an image processing apparatus that applies encoding processing to the plurality of parallax images output from the image sensor to generate encoded data; and a recording unit configured to record, to a memory, the encoded data that has been generated by the image processing apparatus, wherein the image processing apparatus comprising: a processor that executes a program stored in a memory and functions as: a dividing unit configured to divide a plurality of first difference images that are based on addition and subtraction of the plurality of parallax images, and a second difference image between a current composite image that is based on addition of the plurality of parallax images and a past composite image, into a plurality of sub-bands including a sub-band that includes high-frequency components and a sub-band that does not include high-frequency components; and an encoding unit configured to encode the plurality of first difference images and the second difference image, wherein, as for the plurality of first difference images, the encoding unit encodes data of the sub-band that includes high-frequency components, and, as for the second difference image, the encoding unit encodes data of the plurality of sub-bands.

According to yet another aspect of the present invention, there is provided an image sensor comprising: a first semiconductor substrate comprising a plurality of photoelectric conversion units that receive a light beam from an optical system and output a plurality of parallax images; and a second semiconductor substrate comprising an image processing apparatus that applies encoding process to the plurality of parallax images to generate encoded data, wherein: the first semiconductor substrate and the second semiconductor substrate being stacked together, and the image processing apparatus comprising: a processor that executes a program stored in a memory and functions as: a dividing unit configured to divide a plurality of first difference images that are based on addition and subtraction of the plurality of parallax images, and a second difference image between a current composite image that is based on addition of the plurality of parallax images and a past composite image, into a plurality of sub-bands including a sub-band that includes high-frequency components and a sub-band that does not include high-frequency components; and an encoding unit configured to encode the plurality of first difference images and the second difference image, wherein, as for the plurality of first difference images, the encoding unit encodes data of the sub-band that includes high-frequency components, and, as for the second difference image, the encoding unit encodes data of the plurality of sub-bands.

According to still yet another aspect of the present invention, there is provided an image processing method to be performed by an image processing apparatus, the method comprising: dividing a plurality of first difference images that are based on addition and subtraction of a plurality of parallax images, and a second difference image between a current composite image that is based on addition of the plurality of parallax images and a past composite image, into a plurality of sub-bands including a sub-band that includes high-frequency components and a sub-band that does not include high-frequency components; and encoding the plurality of first difference images and the second difference image, wherein, during the encoding, as for the plurality of first difference images, data of the sub-band that includes high-frequency components is encoded, and, as for the second difference image, data of the plurality of sub-bands is encoded.

According to yet still another aspect of the present invention, there is provided an image processing method to be performed by an image processing apparatus, the method comprising: acquiring first encoded data obtained by encoding a plurality of sub-hands of a difference image between a current composite image that is based on addition of a plurality of parallax images and a past composite image, and second encoded data obtained by encoding a sub-band that includes high-frequency components, out of the plurality of sub-bands, of each of a plurality of difference images that are based on addition and subtraction of the plurality of parallax images; adding a composite image that was restored in the past to encoded data of a sub-band that does not include high-frequency components, out of the first encoded data, to restore a composite image; adding a composite image that was restored in the past to encoded data of a sub-band that includes high-frequency components, out of the first encoded data, to restore a composite image; restoring the plurality of parallax images, using the composite image that has been restored as a result of the adding of the composite image that was restored in the past to the encoded data of the sub-band that includes high-frequency components, and the plurality of difference images that have been restored using the second encoded data; generating a refocused image using the plurality of restored parallax images; and adding the refocused image to the composite image that has been restored as a result of the adding of the composite image that was restored in the past to the encoded data of the sub-band that does not include high-frequency components.

According to still yet another aspect of the present invention, there is provided a non-transitory computer-readable medium storing a command that can be executed by a computer, the command, upon being executed by the computer, causing the computer to function as an image processing apparatus comprising: a dividing unit configured to divide a plurality of first difference images that are based on addition and subtraction of a plurality of parallax images, and a second difference image between a current composite image that is based on addition of the plurality of parallax images and a past composite image, into a plurality of sub-bands including a sub-band that includes high-frequency components and a sub-band that does not include high-frequency components; and an encoding unit configured to encode the plurality of first difference images and the second difference image, wherein, as for the plurality of first difference images, the encoding unit encodes data of the sub-band that includes high-frequency components, and, as for the second difference image, the encoding unit encodes data of the plurality of sub-bands.

Further features of the present invention will become apparent from the following description of exemplary embodiments with reference to the attached drawings.

BRIEF DESCRIPTION OF THE DRAWINGS

FIGS. 7A and 7B relate to a functional configuration of an image processing unit according to the embodiment.

DESCRIPTION OF THE EMBODIMENTS

Exemplary embodiments of the present invention will now be described in detail in accordance with the accompanying drawings. Note that the present invention is not limited to the embodiments described below. Also, not all of the constituent elements described in the embodiments are necessarily essential for the present invention. Each functional block in the embodiments can be realized with hardware, such as a programmable logic device or a circuit component, or software that can be executed by a programmable processor, or a combination of such hardware and software. One functional block may be realized with plurality of pieces of hardware. Also, one piece of hardware may realize a plurality of functional blocks. One or more functional blocks may be realized by one or more programmable processors (CPUs, MPUs etc.) executing a computer program that is loaded to a memory.

Hereinafter, embodiments in which the present invention is applied to a digital camera, which serves as an example of an image processing apparatus, will be described. However, the present invention is applicable to any electronic device capable of handling multi-viewpoint images. Such electronic devices include image capture apparatuses, information processing apparatuses such as a computer, a smartphone, a tablet terminal, or a game machine, appliances, robots, and the like, but are not limited thereto.

First Embodiment

Figure 1:
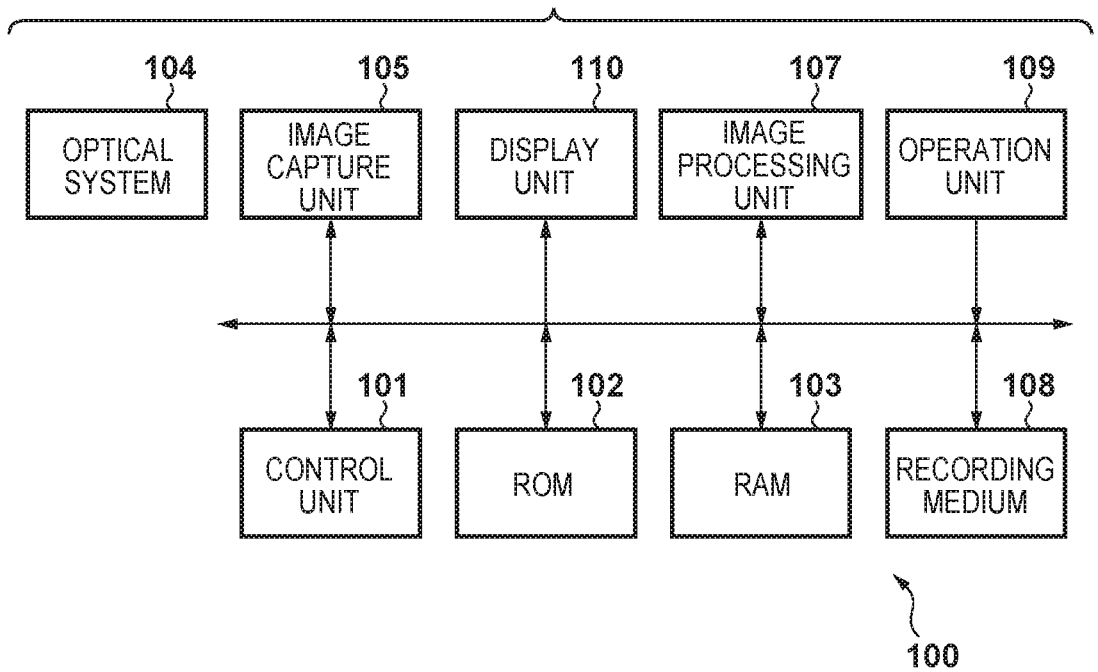
FIG. 1 is a block diagram illustrating a functional configuration of a digital camera serving as an example of an image processing apparatus according to an embodiment.

FIG. 1 is a block diagram illustrating a functional configuration example of a digital camera 100 according to this embodiment. A control unit 101 is constituted by one or more programmable processors (CPUs, MPUs), for example. The control unit 101 controls operations of functional blocks of the digital camera 100 by loading a program stored in a ROM 102 to a RAM 103 and executing it, for example, and realizes functions of the digital camera 100.

The ROM 102 is a rewritable, nonvolatile memory, and stores not only programs that can be executed by the control unit 101, but also various set values, GUI data, and so on.

The RAM 103 is a rewritable, volatile memory, and is used as a system memory to execute programs, or as a temporary data storage area (buffer memory).

An optical system 104 includes a plurality of lenses, a diaphragm, and so on, and forms an optical image of a subject on an imaging plane of an image capture unit 105. The optical system 104 may be or may not be removable. The optical system 104 includes movable lenses, such as a focusing lens, a zoom lens, and a shake correction lens, as well as a mechanism for driving the movable lenses.

The image capture unit 105 includes a pixel unit and peripheral circuits (e.g. readout circuit, A/D converter, encoding circuit etc.). As will be described later, the image capture unit 105 according to this embodiment performs two-dimensional sub-band encoding on image data, and primarily stores the results in the RAM 103.

An image processing unit 107 decodes encoded data stored in the RAM 103, and applies various kinds of image processing, such as white balance adjustment, color interpolation, reduction/enlargement, and filtering, to the image data obtained as a result of the decoding. The image processing unit 107 is implemented by an ASIC in general, but processing thereof may be partially realized by the control unit 101 executing a program. The image processing unit 107 again stores the image data that has been subjected to processing, in the RAM 103. Note that the image processing unit 107 may also perform processing to acquire, from image data, information to be used in automatic focus detection (AF) and automatic exposure control (AE).

The control unit 101 generates an image file using the encoded data output by the image capture unit 105 or the image data that has been processed by the image processing unit 107, and records the generated image file to a recording medium 108. Processing that the image processing unit 107 applies to image data and the configuration of the image file generated by the control unit 101 are predetermined in accordance with a recording format. The recording medium 108 is a removable memory card, for example.

An operation unit 109 is a generic name of input devices for a user to give instructions to the digital camera 100. A shutter button, a moving image capture/pause button, a power button, a menu button, a direction key, a set button, and so on, are included in the operation unit 109. The control unit 101 monitors operations made to the operation unit 109, and performs an operation in accordance with a detected operation.

A display unit 110 is an LCD or an OLED, for example, and displays various kinds of information regarding the digital camera 100, captured images, and GUIs (menu screen etc.). The display unit 110 may also be a touch panel display, and in this case, the touch panel is included in the operation unit 109.

Figure 2A:
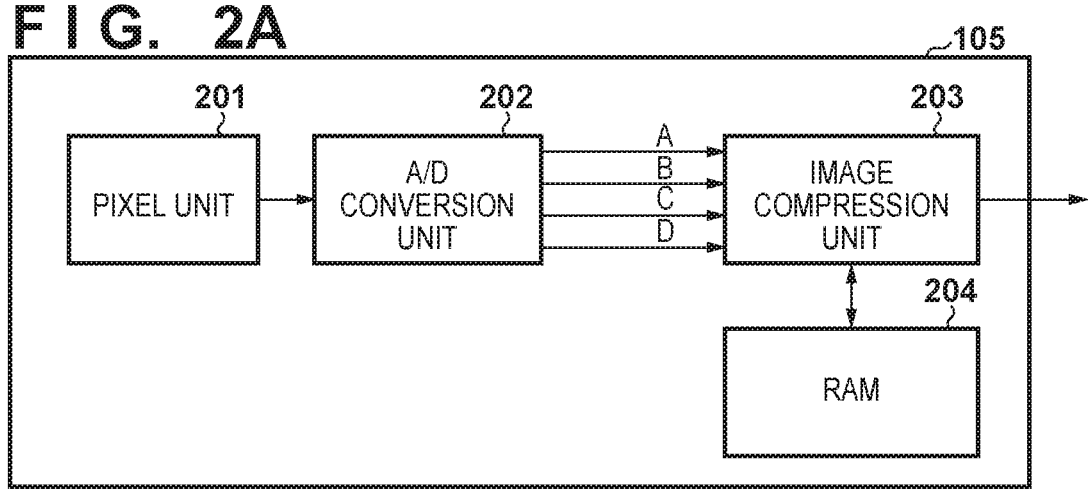
FIGS. 2A to 2C relate to an image capture unit of the digital camera according to the embodiment.

FIG. 2A is a block diagram illustrating a functional configuration example of the image capture unit 105. A pixel unit 201 converts an optical image to an analog image signal, and outputs it to the A/D conversion unit 202. The A/D conversion unit 202 performs A/D conversion on the analog image signal, and outputs it as image data to an image compression unit 203. To reduce the size of a line buffer in the image compression unit 203, the image data is output in units of tiles (T1, T2, T3, . . . ), such as those shown in FIG. 2B. The image compression unit 203 performs two-dimensional sub-band division on an image, and encodes components in a specific band.

In this embodiment, the image capture unit 105 is constituted by one chip in which the pixel unit 201, which is formed in a first layer (first semiconductor substrate), and the image compression unit 203, which is formed in a second layer (second semiconductor substrate), are stacked together, and are electrically connected to each other by at least one through-hole via. The image compression unit 203 is thus embedded in the chip in this embodiment for the purpose of power-saving, high-speed processing, and low-cost design. If the pixel unit 201 is arranged on a substrate within the chip, and the image compression unit 203 is arranged on a substrate outside the chip, there will be more resistance components and capacitance components in the wiring. As a result, the speed of communication therebetween is lower than that in communication using an interconnect within the same chip. To achieve high-speed communication, those units need to be driven by an amplifier to keep signal waveform quality, and driving power needs to be increased. In contrast, by arranging both the pixel unit 201 and the image compression unit 203 on the semiconductor substrates within the same chip, an output interconnect can be made short, and the amplifier can also be omitted. In addition, since the amount of encoded data output from the image capture unit 105 is small, the time taken for communication between the image capture unit 105, the control unit 101, and the image processing unit 107 is shortened, making it possible to increase the processing speed, reduce the processing load, and also reduce power consumption.

The RAM 204 stores a composite image that was generated in the past. The composite image will be described later. In the following description, a composite image that is obtained based on parallax images of a frame that was captured immediately previously (immediately-previous frame (n−1)) is stored as a past composite image in the RAM 204. An image that is captured at this time is called an image of the current frame n.

Figure 2B:
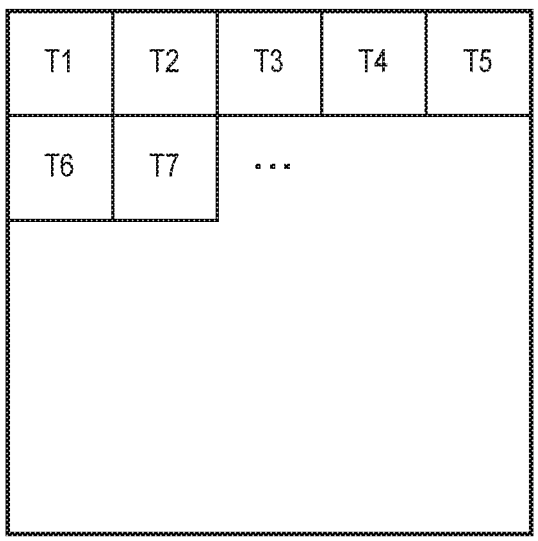
Figure 2C:
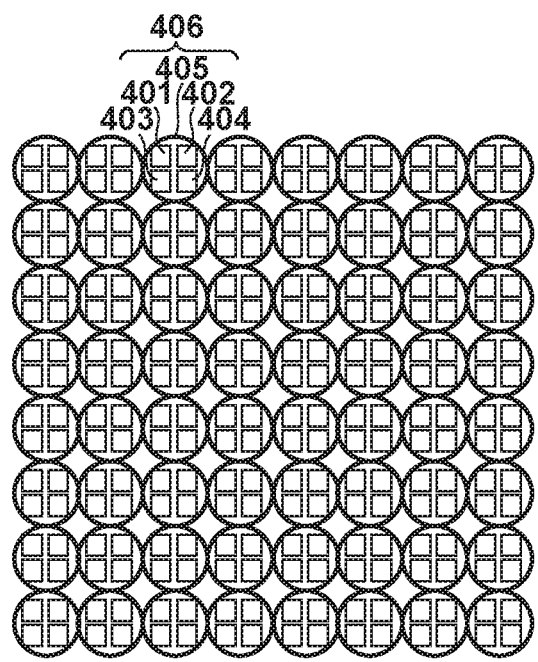

FIG. 2C is a schematic diagram illustrating an example of a pixel configuration and arrangement of the pixel unit 201. In the pixel unit 201, a plurality of pixels 406 are two-dimensionally arranged in the horizontal and vertical directions. Each of the pixels 406 includes one microlens 405 and four photoelectric conversion units 401, 402, 403, and 404. The four photoelectric conversion units 401 to 404, which share the one microlens 405, receive light beams that have passed through different partial pupil areas of the exit pupil of the optical system 104. Accordingly, four parallax images can be obtained as a result of performing exposure or capturing an image once, by independently obtaining analog image signals from a photoelectric conversion unit 401 group, a photoelectric conversion unit 402 group, a photoelectric conversion unit 403 group, and a photoelectric conversion unit 404 group, in the plurality of pixels 406.

In this embodiment, an image obtained by the photoelectric conversion unit 401 group is called an image A. An image obtained by the photoelectric conversion unit 402 group is called an image B. An image obtained by the photoelectric conversion unit 403 group is called an image C. An image obtained by the photoelectric conversion unit 404 group is called an image D.

Figure 3:
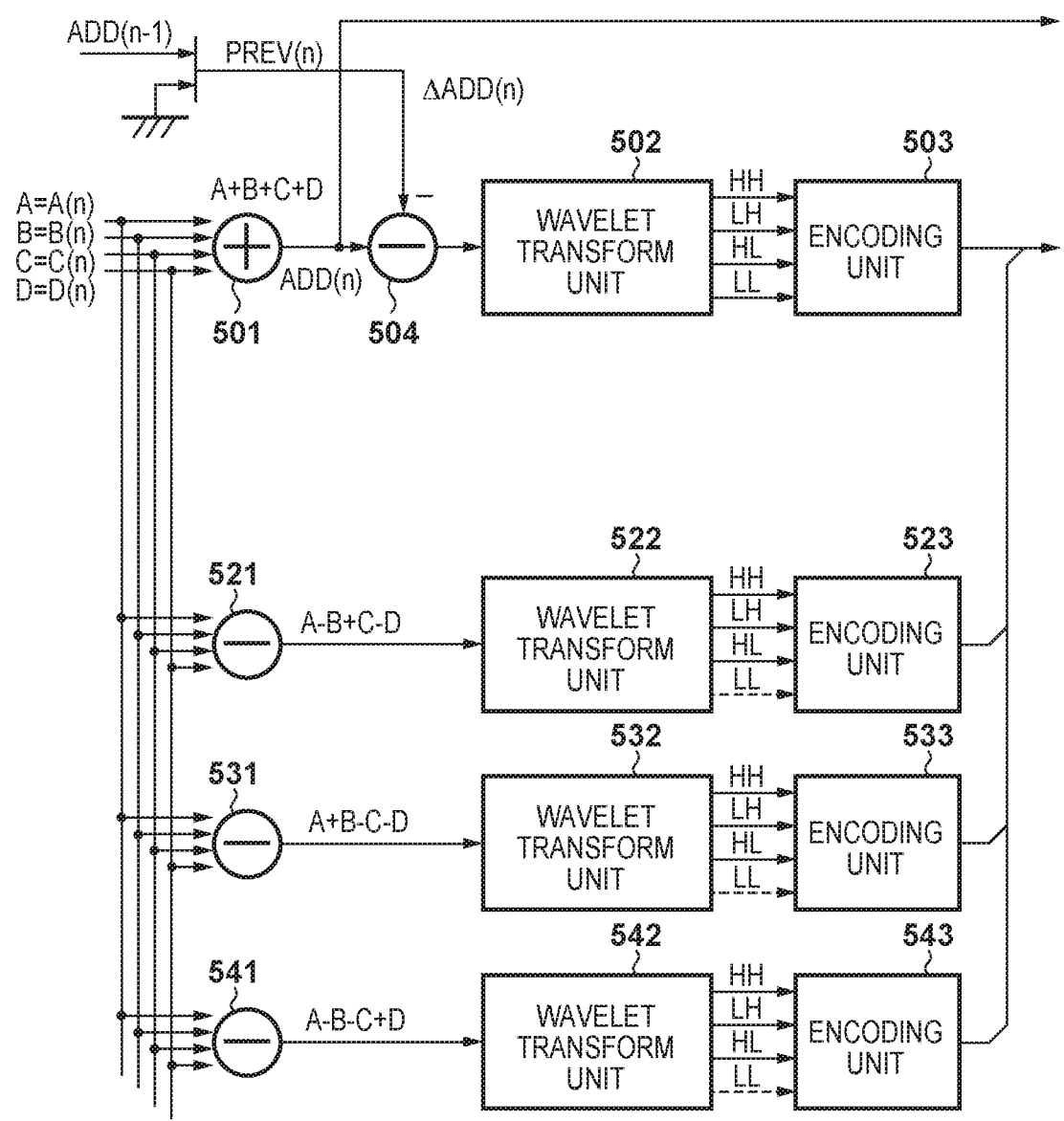
FIG. 3 relates to a functional configuration of an image compression unit of the image capture unit according to the embodiment.

FIG. 3 is a block diagram illustrating a functional configuration example of the image compression unit 203 in FIG. 2A. An adder unit 501 adds the images A to D with the shill amount being 0, and averages respective pixel values (i.e. divides respective pixel values by four), thereby generating a composite image (A+B+C+D). Although the composite image here is an average image of the parallax images, the composite image may not be the average image. For example, a composite image may be generated by simply adding pixel values, and the generated composite image may be corrected so that the range of the pixel values of the parallax images matches the range of the pixel values of the composite image. In this specification, an image A+B refers to an image based on addition of the image A and the image B, or an image that is equal thereto. That is to say, the image A+B may be an image obtained by photoelectric conversion units, each of which is equal to a combination of the photoelectric conversion unit 401 and the photoelectric conversion unit 402. Subtracter units 521, 531, and 541 calculate A−B+C−D, A+B−C−D, and A−B−C+D, respectively. The combinations of addition and subtraction between the images A to D performed by the subtracter units 521, 531, and 541 are determined so that the images A to D can be restored by performing computation also using the composite image, and so that a subtraction is included. Also, in this specification, images obtained by the subtracter units 521, 531, and 541 are called difference images (first difference images), for convenience. Note that addition and subtraction between images can be realized by adding and subtracting values of pixels at the same position in the images. If an addition/subtraction result exceeds an upper limit value of the pixel values or falls below a lower limit thereof, the result is clipped at the upper limit value/lower limit value.

The adder unit 504 subtracts a composite image ADD(n−1) of the immediately-previous frame that has been stored in the RAM 204 from a composite image ADD(n) of the current frame n to generate a difference image ΔADD(n) (second difference image), and supplies the generated difference image ΔADD(n) to the wavelet transform unit 502. In other words, the adder unit 504 generates the difference image ΔADD(n) as an error in inter-frame prediction, using the composite image ADD(n−1) as a predicted image. Accordingly, in the following description, the composite image ADD(n−1) is called a predicted image PREV(n) for the composite image ADD(n). The control unit 101 stores the composite image ADD(n) of the current frame n in the RAM 204 to use the composite image ADD(n) as a predicted image for the composite image of the next frame. Thus, in this embodiment, the amount of encoded data is reduced by thus employing a configuration in which an inter-frame prediction error (difference image) in the composite images is subjected to wavelet transform and encoded.

Wavelet transform units 502, 522, 532, and 542 apply two-dimensional wavelet transform (hereinafter, simply "wavelet transform"), which serves as an example of two-dimensional sub-band division, to the images output by the adder unit 501 and the subtracter units 521, 531, and 541.

Note that, in this embodiment, the wavelet transform unit $5n2$ (n=0, 2 to 4) applies wavelet transform at up to decomposition level 1.

In this embodiment, an image obtained based on addition of all of the images A to D is used as the composite image. However, an image obtained based on addition of some of the images A to D may alternatively be used as a composite image. In any case, refocusing is performed based on a viewpoint position of the composite image. For example, if A+B+C is used as the composite image, a refocused image may be generated using the parallax images B, C, and D, based on the viewpoint of A+B+C serving as a reference. Furthermore, if, for example, a parallax image E from the same viewpoint as those of A+B is obtained from a separately-provided photoelectric conversion element group, the parallax image E may be used as the composite image, and the images A and B, which can be added to obtain the image E, may be used as parallax images.

That is to say, in the present invention, the composite image need only be an image that can be generated based on addition of two or more of the plurality of parallax images. Also, difference images that are to be encoded may be any difference images as long as each of the parallax images that constitute the composite image can be obtained. For example, if an image that corresponds to A+B+C is used as the composite image, combinations such as A+B−C and A−B−C can be used as difference images and encoded. Note that a parallax image that does not constitute the composite image (D in the above example) may be or may not be encoded.

Figure 4:
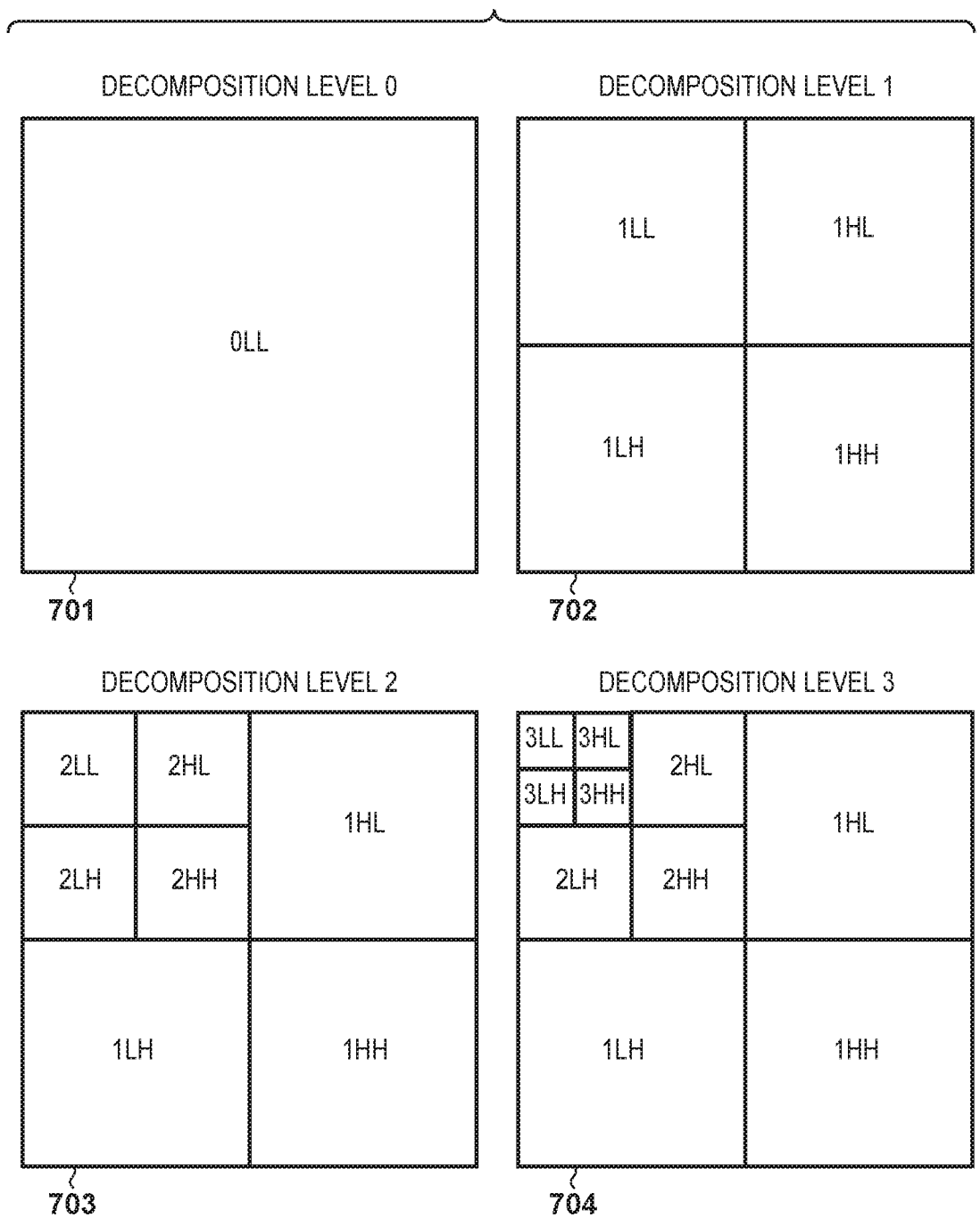
FIG. 4 relates to sub-band division performed by the image compression unit according to the embodiment.

FIG. 4 schematically shows arrangements of a plurality of sub-band signals that are obtained by wavelet transform at decomposition levels 0 to 3. The decomposition level 0, which is denoted by 701, corresponds to an original image. 702 to 704 denote arrangements of sub-bands after wavelet transform at decomposition levels 1 to 3, respectively. "n" in sub-bands nLL, nHL, and nHH indicates the decomposition level (1 to 3), and LL, HL, LH, and indicate types of band-pass filtering (high-pass filtering or low-pass filtering) that is applied in the horizontal and vertical directions. Of wavelet coefficients, the coefficient of the sub-band nLL that does not include high-frequency components is called a scaling coefficient, and the coefficients of the remaining three sub-bands nHL, nLH, and nHH that include high-frequency components are called wavelet expansion coefficients.

Encoding units 503, 513, 523, 533, and 543 apply encoding, such as quantization and arithmetic encoding, to the coefficients of the sub-bands that have been divided by wavelet transform. The encoding method performed by the encoding unit $5n3$ (n=0 to 4) is not particularly limited, and may be lossless or lossy encoding. In this embodiment, the four parallax images are directly input from the A/D conversion unit 202 to the image compression unit 203. However, the A/D conversion unit 202 may input parallax images that have been stored in the RAM 204, for example.

Figure 5A:
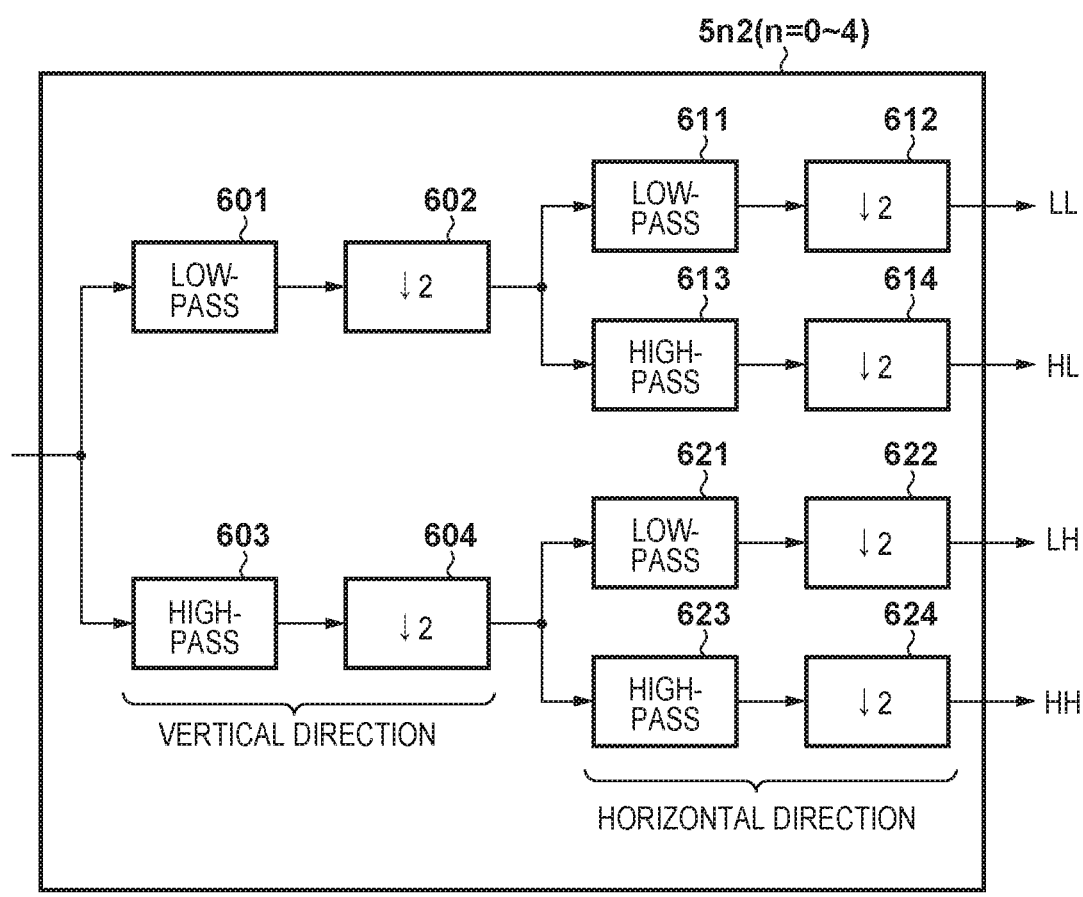
FIGS. 5A and 5B relate to a wavelet transform unit included in the image compression unit according to the embodiment.

FIG. 5A is a block diagram illustrating a functional configuration example of the wavelet transform unit $5n2$ (n=0 to 4). In this embodiment, as an example, wavelet transform using orthonormal wavelets, which are expressed by Expressions 1 and 2 below, is performed.

$$H0(z)=b0+\Sigma bn \cdot (z^n + z^{-n}) \quad \text{(Expression 1)}$$

$$H1(z)=c0 \pm \Sigma cn \cdot (z^n + z^{-n}) \quad \text{(Expression 2)}$$

Here, n is an integer that is any of 0 to 3, and the values of coefficients bn and cn are as follows.

$b0=0.602949$
$b1=0.266864$
$b2=-0.078223$
$b3=-0.016864$
$b4=0.026748$
$c0=1.115087$
$c1=-0.591271$
$c2=-0.057543$
$c3=0.091271$

Figure 5B:
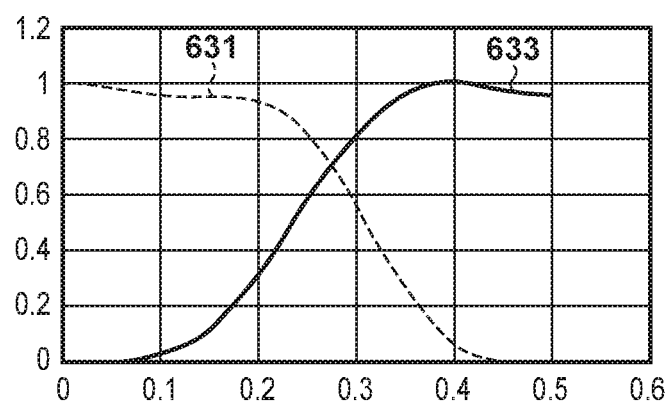

The coefficient bn is a sequence that expresses the scaling function of the wavelet, and the coefficient cn is a sequence that expresses the wavelet. FIG. 5B illustrates amplitude-frequency characteristics 631 of the transfer function $H0(z)$, and amplitude-frequency characteristics 633 of the transfer function $H1(z)$. The vertical axis and the horizontal axis of the amplitude-frequency characteristics indicate, respectively, the amplitude and the normalized frequency that is normalized by sampling frequency, and the Nyquist frequency corresponds to 0.5.

The low-pass filter unit 601 has the transfer function $H0(z)$, and generates a scaling coefficient in the vertical direction. A high-pass filter unit 603 has the transfer function $H1(z)$, and generates a wavelet expansion coefficient in the vertical direction. Downsampling units 602 and 604 halve the number of pixels through downsampling in the vertical direction.

Low-pass filter units 611 and 621 have the transfer function $H0(z)$, and generate scaling coefficients in the horizontal direction. High-pass filter units 613 and 623 have the transfer function $H1(z)$, and generate wavelet expansion coefficients in the horizontal direction, Downsampling units 612, 622, 614, and 624 halve the number of pixels through downsampling in the horizontal direction.

The encoding unit 503, which processes the composite image, outputs encoded data of the scaling coefficient (1LL) and the wavelet expansion coefficients (1LH, 1HL, and 1HH). The encoding units 523, 533, and 543, which process three difference images, only output encoded data of the wavelet expansion coefficients (1LH, 1HL, and 1HH). This can also be realized by outputting only coefficients that are to be encoded, from the wavelet transform units to the respective encoding units, or by ignoring coefficients other than those that are to be encoded by the encoding units.

Since all of the wavelet coefficients LL, HL, LH, and HH are downsampled to be halved in both the horizontal and vertical directions when generated, the number of coefficients after having been encoded is one-fourth of that before being encoded. Accordingly, if the number of pixels of the original image is 1, the number of encoded data is $1+\frac{3}{4}\times 3=(3+\frac{1}{4})$, and the amount of encoded data can thus be reduced compared with the case of encoding all sub-bands of the images A to D ($1\times4=4$).

Figure 6:
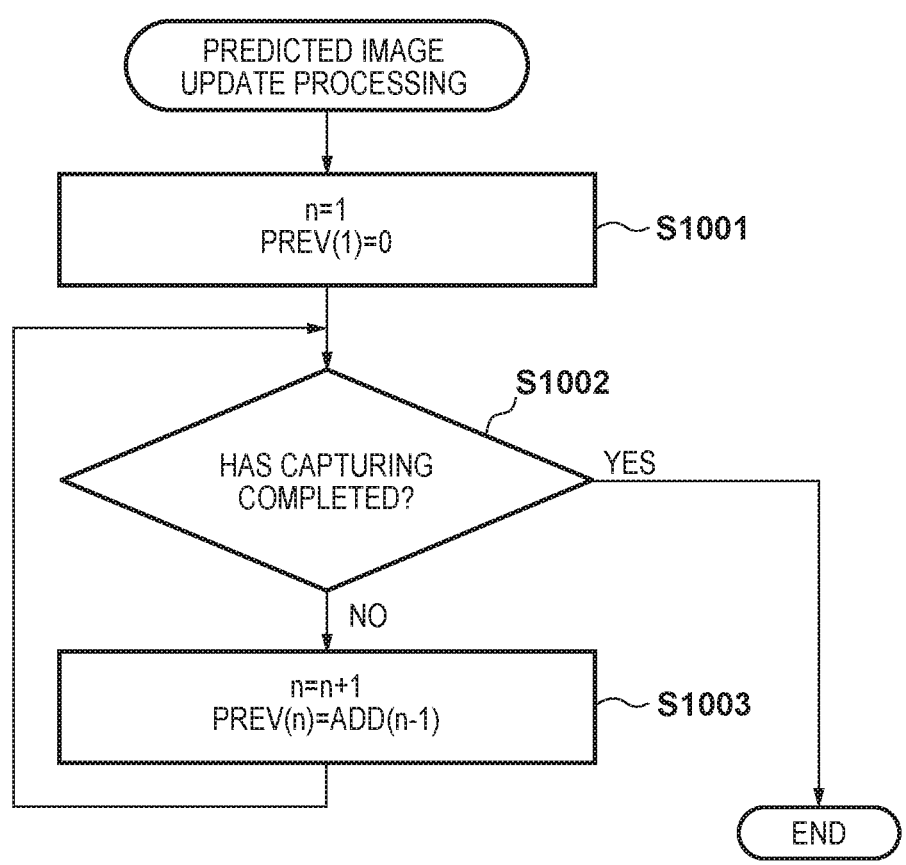
FIG. 6 is a flowchart relating to predicted image update processing according to the embodiment.

FIG. 6 is a flowchart relating to predicted image update processing performed by the control unit 101 in this embodiment. This processing can be performed in parallel with image capturing for recording, for example. Here, this processing is performed during capturing of moving image or continuous capturing of still images during which the immediately-previous frame and the current frame are highly correlated, but may also be performed when a single still image is captured.

In step S1001, the control unit 101 performs initialization. Here, initialization includes setting the variable n to 1, and preparing an initial predicted image PREV(1). PREV(1) may be an image in which color components of all pixels have a fixed value, for example. Here, the fixed value is 0.

In step S1002, the control unit 101 determines whether or not the capturing of an image has ended, ends the predicted image update processing if the capturing of an image has ended, and advances the processing to step S1003 if not. The end of the capturing of an image can be determined based on whether or not a predetermined state, such as an instruction to end the recording of a moving image being given, or pressing of a release button being ended, has been detected.

In step S1003, the control unit 101 increments the variable n by 1, sets the current composite image ADD(n−1) as a new predicted image PREV(n), and returns the processing to step S1002. Here, since the variable n is incremented by 1 before updating the predicted image, the frame number of the current composite image is n−1).

As for the composite image, the scaling coefficient (LL) is encoded. Since the scaling coefficient corresponds to an image in the lowest band, there is a tendency that the influence of camera shakes and subject blur is smaller, and the pixel values of the difference image are smaller. Accordingly, the amount of encoded data can be efficiently reduced by inter-frame prediction encoding. In contrast, in difference images for which the wavelet expansion coefficients (LH, HL, and HH) including high-frequency components of the images are encoded, there is a tendency that the pixel values of the difference image are greater due to the influence of camera shakes and subject blur. Accordingly, the effect of inter-frame prediction encoding is insignificant, and in this embodiment, inter-frame prediction encoding is not performed for difference images. This configuration can increase the efficiency of reducing the amount of encoded data while suppressing an increase in the RAM capacity and computational costs.

In the pixel unit with the configuration shown in FIG. 2C, if vignetting occurs on some of the light beams toward the pixels 406 due to the optical system 104, the amount of light incident on the photoelectric conversion units 401 to 404 becomes uneven. Consequently, the signal level decreases in at least one of the image signals output by the photoelectric conversion units 401 to 404. Since the signal level lowers in the same photoelectric conversion unit in all pixels, a luminance difference (hereinafter, "shading") occurs between parallax images.

Since vignetting pertains to the characteristics of the optical system 104, the photoelectric conversion unit in which the signal level will decrease and the degree of the decrease in the signal level are known, and accordingly the lowering in the signal level can be corrected (shading correction). However, the degree of shading depends on optical conditions (exit pupil distance, f-number etc.) of the optical system 104, and therefore, preset shading correction may be excessive or insufficient. Also, it is known that the shading component can be approximated by a low-degree polynomial, and most of correction errors (overcorrection component, inverse correction component) are included in the scaling coefficient (LL) due to wavelet transform.

If an error has occurred in shading correction, a differential value between parallax images increases. For this reason, the efficiency of inter-frame differential encoding between parallax images deteriorates. However, in this embodiment, as for the difference image between parallax images, only the wavelet expansion coefficients that are hardly affected by correction errors are encoded. Accordingly, the encoding efficiency does not significantly deteriorate even if an error has occurred in shading correction.

Moreover, most of the wavelet expansion coefficients, which include high-frequency components of images, pertain to the subject component with small blur, and parallax between four parallax images is also small. For this reason, a differential value between parallax images is small, and a high encoding efficiency can also be realized in this regard. The encoding efficiency can be increased by thus performing inter-frame prediction encoding for the composite image, and encoding difference images for the parallax images.

Since the amount of encoded data output from the image capture unit 105 is reduced, it is possible to suppress a decrease in the frame rate for moving images and the number of still images that can be continuously captured, even in the case of handling multi-viewpoint images. Also, the number of still images that can be continuously captured can be increased without changing the buffer capacity to be secured in the RAM 103.

The control unit 101 records the encoded data of the composite image and the three difference images that are output by the image capture unit 105, to the recording medium 108. Note that, when recording the encoded data into the recording medium 108, the control unit 101 includes, in a header or the like of a data file, information regarding the decomposition level of wavelet transform and sub-bands recorded in the composite image and the parallax images. The encoded data that is read out from the recording medium 108 can be loaded to the RAM 103, and can be decoded and subjected to refocusing by the image processing unit 107.

Figure 7A:
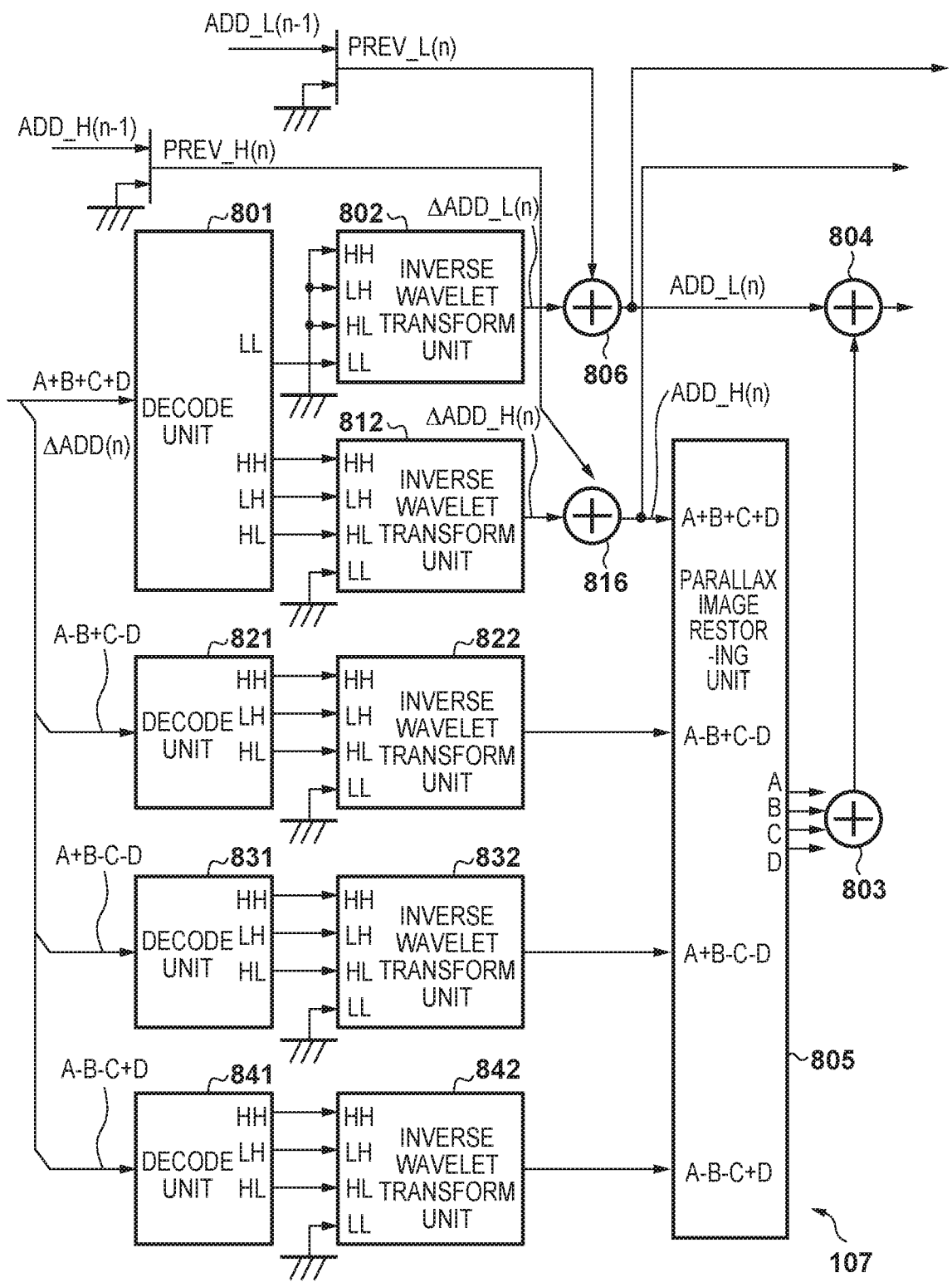

FIG. 7A illustrates, as functional blocks, operations performed when the image processing unit 107 decodes encoded data. Decoding and refocusing described here is merely part of a variety of image processing that the image processing unit 107 can perform. Processing to extract encoded data from a data file and distribute the encoded data to the decoding units is also performed within the image processing unit 107. The decoding unit 801 decodes encoded data (scaling coefficient (1LL) and wavelet expansion coefficients (1LH, 1HL, and 1HH) at decomposition level 1) of ADD(n), which is a prediction error in the composite image. The decoding units 821, 831, and 841 decode encoded data (wavelet expansion coefficients (1LH, 1HL, and 1HH) at decomposition level 1) of the difference images. The decoding unit 8n4 (n=0, 2 to 4) performs decoding corresponding to the encoding method.

Inverse wavelet transform units 802, 812, 822, 832, and 842 restore the images that have been divided into sub-bands (sub-hand restoration), by performing two-dimensional inverse wavelet transform on the respective decoded sub-hand data. The decoding unit 801, which decodes the encoded data of the composite image, only supplies the scaling coefficient (1LL) to the inverse wavelet transform unit 802. For this reason, the inverse wavelet transform unit 802 performs inverse wavelet transform with the wavelet expansion coefficients (1LH, 1HL, and 1HH) being 0.

Furthermore, the decoding unit 801 supplies the decoded wavelet expansion coefficients (1LH, 1HL, and 1HH) of the composite image to the inverse wavelet transform unit 812. The decoding units 821, 831, and 841 supplies the decoded wavelet expansion coefficients (1LH, 1HL, and 1HH) of the difference images to the inverse wavelet transform units 822, 832, and 842. The inverse wavelet transform units 812, 822, 832, and 842 perform inverse wavelet transform with the scaling coefficient (1LL) being 0.

Adder units 806 and 816 add a composite image ADD_L (n−1) and a composite image ADD_H(n−1) of the previous frame (n−1), which are stored in the RAM 103, to difference images ΔADD_L(n) and ΔADD_H(n), Which relate the current frame n, respectively. Here, the composite image ADD_L(n−1) is a predicted image PREV_L(n), and the composite image ADD_H(n−1) is a predicted image PREV_H(n).

The composite image ADD_L(n), which is generated as a result of the adder unit 806 adding the predicted image PREV_L(n) to the composite image ADD_L(n), is stored, as a predicted image PREV_L(n) of low-frequency components of the next frame, in the RAM 103, Similarly, the composite image ADD_H(n), which is generated as a result of the adder unit 816 adding the predicted image PREV_H(n) to the composite image ADD_H(n), is stored, as a predicted image PREV_H(n) of high-frequency components of the next frame, in the RAM 103. Note that no predicted image exists for the first frame, and therefore PREV_L and PREV_H are 0.

A parallax image restoration unit 805 calculates Expressions 3 to 6 below for the composite image and the difference images that have been restored by the inverse wavelet transform unit 8n2 (n=1 to 4), and restores the four parallax image (images A to D).

$$A=(W+X+Y+Z)/4 \qquad \text{(Expression 3)}$$

$$B=(W-X+Y-Z)/4 \qquad \text{(Expression 4)}$$

$$C=(W+X-Y-Z)/4 \qquad \text{(Expression 5)}$$

$$D=(W-X-Y-Z)/4 \qquad \text{(Expression 6)}$$

Here, W, X, Y, and Z are as follows.

W=A+B+C+D (composite image output by the inverse wavelet transform unit 816)

X=A−B+C−D (difference image output by the inverse wavelet transform unit 822)

Y=A+B−C−D (difference image output by the inverse wavelet transform unit 832)

Z=A−B−C+D (difference image output by the inverse wavelet transform unit 842)

The parallax image restoration unit 805 supplies the restored images A to D to a shift-and-add operation unit 803.

The shift-and-add operation unit 803 performs a shift-and-add operation for refocusing, on the restored images A to D. Refocusing by means of a shift-and-add operation is known, as described in Japanese Patent Laid-Open No. 2015-171097, for example. The control unit 101 displays, for example, the composite image on the display unit 110, and makes the user select the position to be brought into focus. For example, the control unit 101 determines the amount and direction of the shift-and-add operation so that the position in the image that has been designated through the operation unit 109 comes into focus, and notifies the shift-and-add operation unit 803 of the determined amount and direction. The shift-and-add operation unit 803 performs the shift-and-add operation on the images A to D in accordance with the shift direction and amount of which it has been notified, thereby generating a refocused image. The shift-and-add operation unit 803 outputs the image that has been subjected to refocusing, to an adder unit 804. The adder unit 804 adds the composite image that has been restored with the wavelet expansion coefficients (1LH, 1HL, and 1HH) being 0, and the image obtained by performing the shift-and-add operation on the parallax images that have been restored with the scaling coefficient (1LL) being 0. An ultimate refocused image is obtained by the adder unit 804.

FIG. 7B is a block diagram illustrating a functional configuration example of the inverse wavelet transform unit 8n2 (n=0 to 4) in FIG. 7A.

Upsampling units 901, 903, 911, and 913 double the number of pixels through upsampling in the horizontal direction. Low-pass filter units 902 and 912 apply low-pass filtering in the horizontal direction. High-pass filter units 904 and 914 apply high-pass filtering in the horizontal direction. Upsampling units 921 and 923 double the number of pixels through upsampling in the vertical direction. A low-pass filter unit 922 applies low-pass filtering in the vertical direction. A high-pass filter unit 924 applies high-pass filtering in the vertical direction. Adder units 905, 915, and 925 add intermediate images in the process of inverse wavelet transform.

The inverse wavelet transform units also perform inverse wavelet transform using orthonormal wavelets, which are expressed by Expressions 7 and 8 below.

$$G0(z)=d0+\Sigma dn \cdot (z^n+z^{-n}) \quad \text{(Expression 7)}$$

$$G1(z)=e0+\Sigma en \cdot (z^n+z^{-n}) \quad \text{(Expression 8)}$$

The values of the coefficients are as follows.

Here, n is an integer that is any of 0 to 3, and the values of coefficients bn and en are as follows.

d0=1.115087
d1=0.591271
d2=−0, 057543
d3=−0.091271
e0=0.602949
e1=−0.266864
e2=−0.078223
e3-0.016864
e4=0.026748

The transfer function of the low-pass filter units is $G0(z)$, and the transfer function of the high-pass filter units is $G1(z)$.

In this embodiment, a refocused image is generated without performing shift-and-add operation on low-frequency components (scaling coefficient (1LL)) of the images. However, in the case of refocusing with the shift amount being about 1 or 2 pixels, focus in low-frequency components hardly changes. For this reason, possible to achieve a focus adjustment effect that is equal to that of a conventional technique in which a shift-and-add operation is performed on all sub-band components.

As described above, in this embodiment, regarding a plurality of parallax images, two-dimensional sub-band division is performed on a composite image obtained by combining the plurality of parallax images, and on a plurality of difference images obtained by performing addition and subtraction between the plurality of parallax images. As for the composite image, data of the respective sub-bands is encoded, and, as for the difference images, data of the sub-bands including high-frequency components is encoded. This configuration can reduce the amount of encoded data compared with the case of encoding a plurality of parallax images, without restricting the use of the parallax images. Furthermore, inter-frame prediction encoding is performed for the composite image that is not significantly affected by a shake or a blur of a subject, and thus, the amount of encoded data can be further reduced.

This embodiment does not restrict the area to be encoded in the parallax images. For this reason, for example, in the case of using the plurality of parallax images to generate a refocused image, any area in the images can be subjected to refocusing. Furthermore, the frame rate during image capturing and the number of images that can be continuously captured can be increased without changing the configuration of the image capture apparatus. Note that the use of parallax images to which the present invention is applied is not limited to generation of a refocused image. For example, the present invention is also applicable to parallax images that are used in automatic focus detection. In this case, an increase in the image capture frame rate of parallax images as a result of applying the present invention leads to the shortening of the time required for automatic focus detection.

Second Embodiment

Next, the second embodiment of the present invention will be described. Note that this embodiment can be carried out by the same functional configuration as that of the digital camera 100 described according to the first embodiment. For this reason, the second embodiment will be described using the same reference numerals as those in the first embodiment.

Figure 8A:
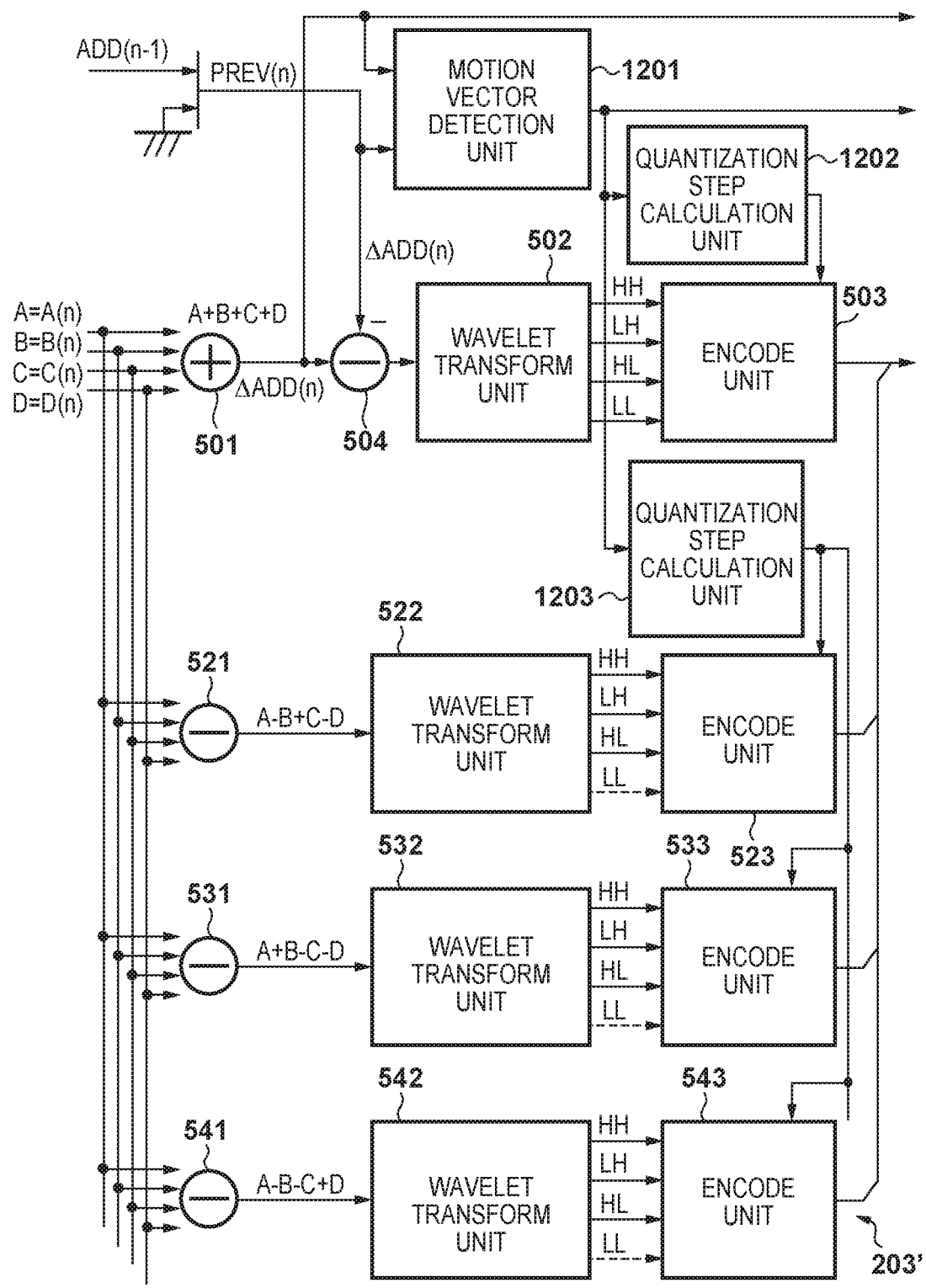
FIGS. 8A and 8B relate to a functional configuration of the image compression unit according to a second embodiment.

FIG. 8A is a block diagram illustrating a functional configuration example of an image compression unit 203' according to this embodiment, where the same constituent elements as those of the image compression unit 203 according to the first embodiment are assigned the same reference numerals as those in FIG. 3. The image compression unit 203' according to this embodiment differs from the image compression unit according to the first embodiment in that a motion vector detection unit 1201 and quantization step calculation units 1202 and 1203 are additionally provided.

The motion vector detection unit 1201 detects a motion vector V=(Vx, Vy) indicating a motion made between a composite image ADD(n) of a current frame, which is output by the adder unit 501, and a composite image ADD(n−1) of the previous frame, which is read out as a predicted image RREV(n) from the RAM 204. The motion vector detection unit 1201 detects a motion vector in each of the tiles, which are shown in FIG. 2B, of the composite image ADD(n) of the current frame. The method for detecting a motion vector is not particularly limited, and any known method can be used. For example, an area that is highly correlated with a tile area in the composite image ADD(n) of the current frame is searched in the composite image ADD(n−1) of the previous frame, and a position change between these areas can be detected as a motion vector.

The quantization step calculation units 1202 and 1203 determine a quantization step QSTEP to be used in the encoding unit $5n3$ (n=0, 2 to 4), based on the motion vector detected by the motion vector detection unit 1201. The quantization step calculation units 1202 and 1203 determine the quantization step QSTEP for each tile of the composite image ADD(n) of the current frame.

Figure 8B:
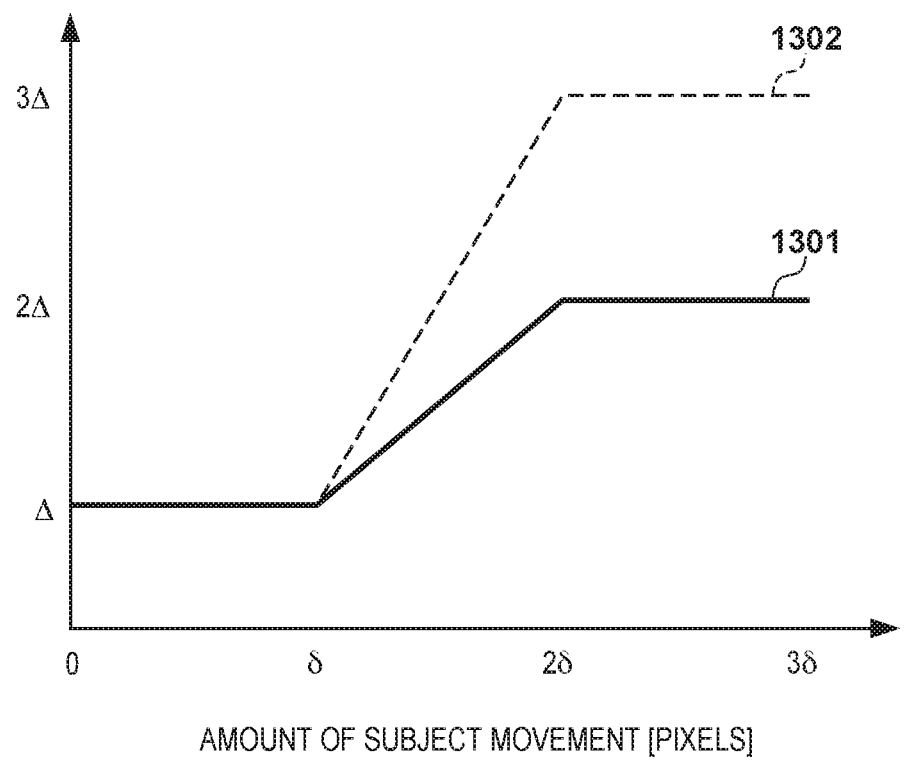

FIG. 8B illustrates an operation of the quantization step calculation units 1202 and 1203 in FIG. 8A. The horizontal axis indicates the amount of subject movement MOV, and the vertical axis indicates the quantization step QSTEP. $\delta$ denotes the diameter of the permissible circle of confusion, and $\Delta$ denotes the default quantization step. Note that, since the diameter of the permissible circle of confusion may vary depending on the f-number or the like of the optical system 104, the diameter of the permissible circle of confusion $\delta$ may also be calculated in accordance cage capturing conditions for the current frame.

The quantization step calculation units 1202 and 1203 determine the respective quantization steps QSTEP in accordance with characteristics 1301 and 1302, respectively. The amount of subject movement MOV [pixels] can be obtained according to the following expression.

$$MOV=VL \cdot RT \cdot Tv \quad \text{(Expression 9)}$$

Here, $VL=\sqrt{(Vx^2+Vy^2)}$, RT denotes the frame rate (frame/sec), and Tv denotes the shutter speed. For example, if RT=60 fps and Tv=1/100 seconds, MOV=VL·60·1/100 [pixels].

If the amount of subject movement MOV during an exposure period (shutter speed Tv) is smaller than or equal to the diameter of the permissible circle of confusion δ, a blur of the subject cannot be visually recognized in the image. For this reason, if the amount of subject movement MOV is smaller than δ, the quantization step calculation units 1202 and 1203 determine the respective quantization steps QSTEP to be a default value A with which priority is given to image quality, rather than the reduction in the amount of encoded data. In contrast, if the amount of subject movement MOV exceeds the diameter of the permissible circle of confusion δ, a blur of a subject becomes large enough to be visually recognized in the image, and accordingly, the quantization steps are increased to give priority to the reduction in the amount of encoded data, rather than image quality. Also, if a blur of a subject is large enough to be visually recognized in the image, the effect of fine focus adjustment through refocusing deteriorates. For this reason, the quantization step that is to be used in the encoding of the difference images used in refocusing and is determined by the quantization step calculation unit 1203 is made larger than the quantization step to be used in the encoding of the composite image to further give priority to the reduction in the amount of encoded data.

In the relationship between the amount of subject movement MOV and the quantization step QSTEP illustrated in FIG. 8B, the quantization steps are linearly increased in the range where the amount of subject movement MOV exceeds the diameter of the permissible circle of confusion δ and is smaller than 2δ, and take fixed values after the amount of subject movement MOV exceeds 2δ. However, this is merely an example.

The quantization steps are set to give priority to image quality if the amount of subject movement is in a range where a blur of a subject cannot be visually recognized in the image (i.e. if the value of a blur of a subject is smaller than or equal to a threshold), and are set to give priority to the reduction in the amount of encoded data if the amount of subject movement is in a range where a blur of a subject can be visually recognized in the image.

In a range where a blur of a subject can be visually recognized in the image (i.e. if the value of a blur of a subject exceeds the threshold), the quantization step to be used in the encoding of the difference images the encoding of high-frequency components) is made larger than or equal to the quantization step to be used in the encoding of the composite image.

In a range where a blur of a subject can be visually recognized in the image, the quantization step for a second amount of subject movement MOV2 is made larger than the quantization step for a first amount of subject movement MOV1 (MOV2>MOV1).

The quantization steps may be determined so as to satisfy one or more of the above three conditions.

The encoding unit 503 performs the encoding using the quantization step determined by the quantization step calculation unit 1202, and the encoding unit 5n3 (n=2 to 4) performs the encoding using the quantization step determined by the quantization step calculation unit 1203. The encoding unit 5n3 (n=0, 2 to 4) outputs, for each tile, the quantization steps used in the encoding and the magnitude of the motion vector in the horizontal and vertical directions, together with the encoded data. The control unit 101 records this information in association with the tiles, to header information of a file.

Here, an example has been described in which the magnitude of a blur of a subject in an image is evaluated based on a motion vector, and the quantization steps are determined based on the magnitude of a blur of a subject. However, the quantization steps may alternatively be determined while evaluating another index using a motion vector. For example, as for a subject that moves in a complicated manner, such as a splash of water or a leaf that is swinging in the wind, it is difficult for human eyes to recognize a difference even if the quantization steps are increased, and moreover, the effect of fine focus adjustment through refocusing is small. Since there is a tendency that the variance of a motion vector of a subject that moves in a more complicated manner is larger, the amount of encoded data can also be efficiently reduced by determining the quantization steps using the variance of a motion vector instead of the amount of subject movement. For example, the quantization steps in the case where the variance of a motion vector that is detected over time in the same tile takes a second value are made larger than the quantization steps in the case of a first value, which is smaller than the second value. Note that, for example, the sum of the variance of the horizontal component and the variance of the vertical component of a motion vector over a plurality of frames can be used as the variance of the motion vector.

According to this embodiment, based on a motion vector, the quantization steps are made larger for an area where it is considered that the effect of fine focus adjustment through refocusing is small, in the image area to be encoded, than the quantization steps for an area where it is not considered that the effect of fine focus adjustment is small. Accordingly, the amount of encoded data can be efficiently reduced while substantially keeping the refocusing effect.

Third Embodiment

Next, the third embodiment of the present invention will be described. Note that this embodiment can be carried out by a functional configuration in which the image compression unit 203' described in the second embodiment is used in the digital camera 100 described in the first embodiment. For this reason, the third embodiment will be described while using the same reference numerals as those in the first and second embodiments.

Figure 9:
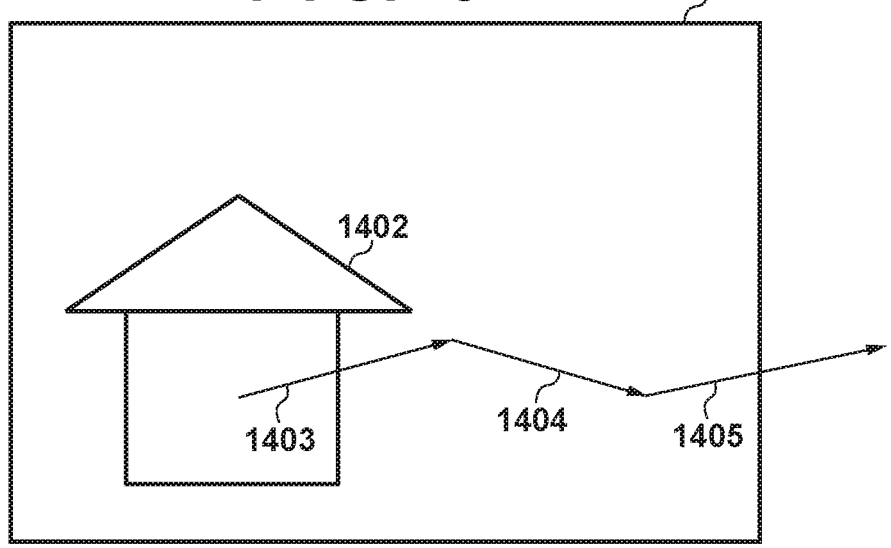
FIG. 9 is a schematic diagram relating to out-of-frame detection according to a third embodiment.

This embodiment relates to a configuration in which a scene change, such as a subject having moved out of the frame, is detected using motion vectors that are detected according to the second embodiment, and the predicted image is reset. FIG. 9 illustrates the principle based on which the control unit 101 detects a subject having moved out of the frame, using motion vectors.

Here, a moving image is being captured, or still images are being continuously captured, in a fixed image capture area 1401. Focus is on a subject 1402 when the image starts being captured. Motion vectors 1403 to 1405 are connected that are detected by the motion vector detection unit 1201 in the image compression unit 203', in a tile that includes the subject 1402 in the second to fourth frames. By thus accumulating the detected motion vectors and determining whether or not the end point coordinates of the latest motion vector is out of the image capture area 1401, whether or not the subject 1402 has moved out of the frame can be determined. In the example in FIG. 9, the end point of the motion vector 1405 detected in the fourth frame is out of the image capture area 1401, and it can therefore be detected that the subject 1402 has moved out of the frame. Here, "frame-out", or a subject having moved out of the frame, means that a state where an entire subject area is included in the image capture area has changed to a state where the subject area have moved, at least partially, out of the image capture area (i.e. no longer appears in the image being captured).

Here, the image coordinate system is, for example, an orthogonal coordinate system where the upper left corner of the image capture area 1401 is the origin (0) and the rightward direction and the downward direction are positive directions, and the size of the image capture area 1401 is xmax pixels horizontally (in a horizontal direction) and ymax pixels vertically (in a vertical direction). The control unit 101 (scene change detection means) discriminates the motion vectors of the same subject, based on the positional relationship between the starting point of the motion vector detected in the current frame and the end point of the motion vector detected in the previous frame. The control unit 101 then obtains the sum (x+xsum) of a cumulative value xsum of the horizontal component of the motion vectors of the same subject and a horizontal image coordinate x of the starting point of the motion vector that was detected first. If the SUM (x+xsum) is negative or exceeds xmax−1, the control unit 101 determines that the corresponding subject has moved out of the frame, and a scene change has occurred. Similar determination can also be performed in the vertical direction.

Figure 10:
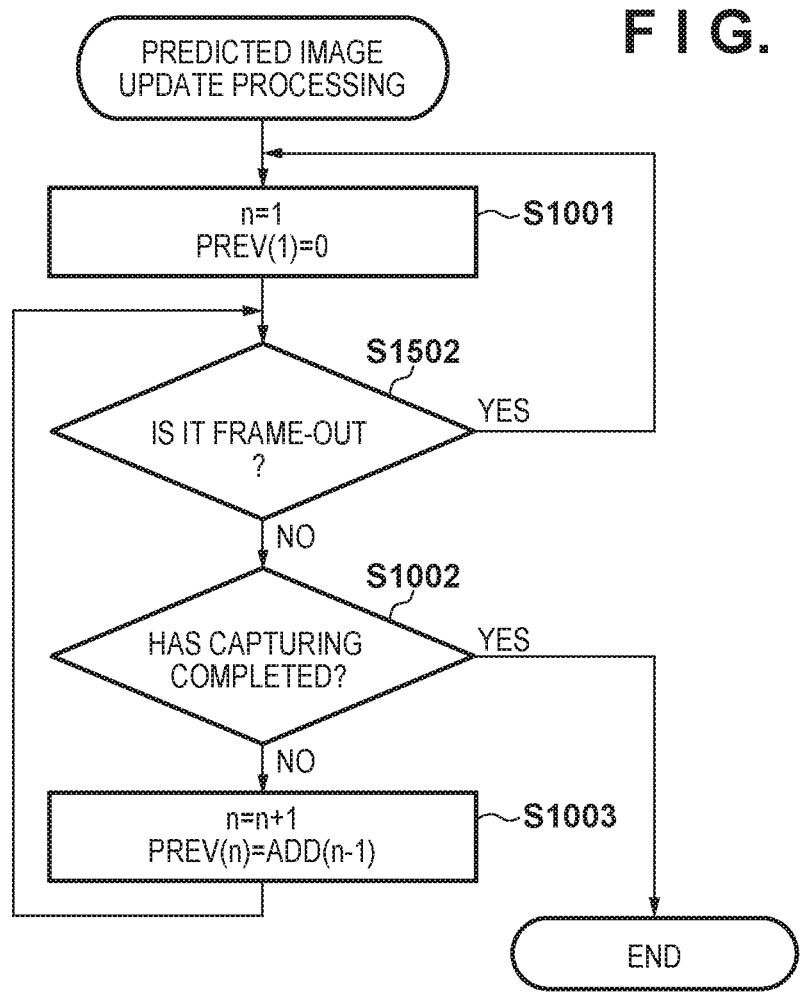
FIG. 10 is a flowchart relating to predicted image update processing according to the third embodiment.

FIG. 10 is a flowchart relating to predicted image update processing performed by the control unit 101 according to this embodiment. Steps in which the same processing as that in the first embodiment is performed are assigned the same reference numerals as those in FIG. 6. In this embodiment, if, in step S1502, a frame-out is detected, the control unit 101 returns the processing to step S1001 and initializes (resets) the predicted image and the value of the frame counter n. If, in step S1502, no frame-out is detected, the same processing as that in the first embodiment is performed.

If the predicted image was reset during the encoding, the control unit 101 records the frame number of the frame during which the predicted image was reset, to a header of a data file. Thus, the predicted image can also be reset during the decoding. That is to say, if the previous frame (n−1) corresponds to the frame during which the predicted image was reset, the predicted images PREV_L(n) and PREV_H (n) that are to be added by the adder units 806 and 816 are set as an image with all pixel values being 0.

According to this embodiment, if, for example, a scene change made as a result of the camera being moved largely is detected as a subject having moved out of the frame, inter-frame prediction encoding of the composite image and the predicted image to be used in decoding can be reset. Accordingly, a decrease in the encoding efficiency due to a scene change can be suppressed, in addition to the effects of the other embodiments. Note that a scene change may not necessarily be detected using motion vectors. Any other known methods may be used in the detection, e.g. it may be determined that a scene change has occurred if the difference between the composite image of the previous frame and the composite image of the current frame exceeds a threshold (i.e. if it is determined that the mutual correlation therebetween is low).

Fourth Embodiment

Next, the fourth embodiment of the present invention will be described. Note that this embodiment can be carried out by the same functional configuration as that of the digital camera 100 described according to the first embodiment. For this reason, the fourth embodiment will be described using the same reference numerals as those in the first embodiment.

Figure 11:
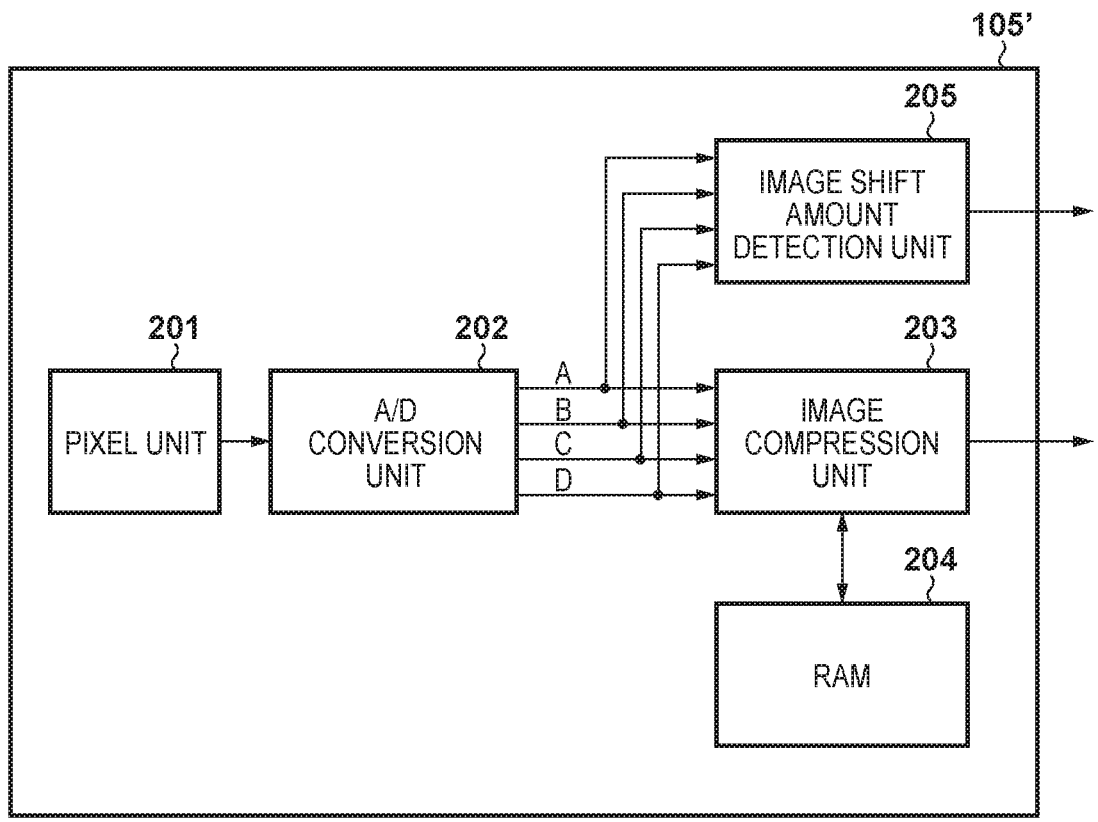
FIG. 11 relates to a functional configuration of the image capture unit according to a fourth embodiment.

FIG. 11 is a block diagram illustrating a functional configuration example of an image capture unit 105' according to this embodiment, where the same functional blocks as those of the image capture unit 105 according to the first embodiment are assigned the same reference numerals as those in FIG. 2A, The image capture unit 105' has a configuration in which an image shift amount detection unit 205 is additionally provided in the image capture unit 105.

The image shift amount detection unit 205 detects an image shift amount between parallax images, in each of the tiles shown in FIG. 2B. For example, an image shift amount in tiles that correspond to a subject to be tracked can be detected, as in the case of detecting a frame-out in the third embodiment. Here, the subject to be tracked may be an area (e.g. a human face) that is detected in an image and has a specific feature. An image shift amount between parallax images can be detected using a known method. For example, a shift amount with which a quality evaluation value for a combined image is largest, the combined image being obtained by performing a shift-and-add operation on a pair of parallax images between which the image shift amount is to be detected, can be calculated as the image shift amount. An image shift amount can be used in automatic focus detection in the optical system 104, for example, but the use thereof is not limited.

Figure 12:
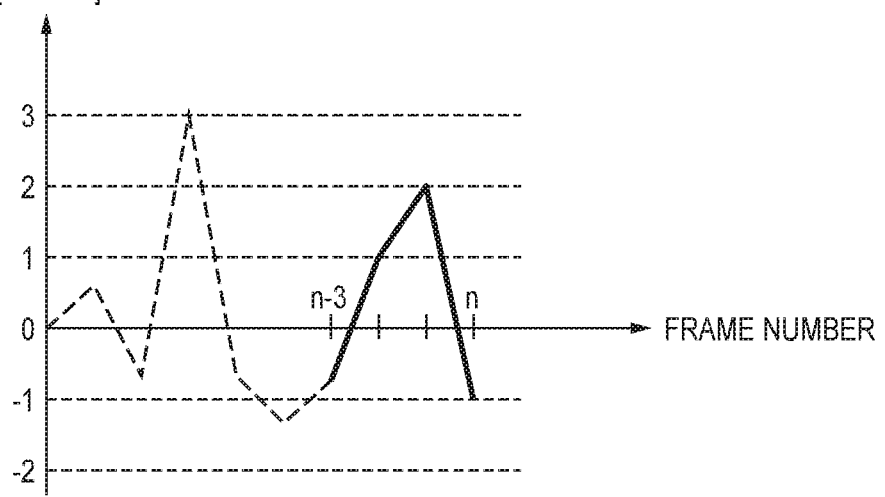
FIG. 12 relates to image shift amount detection according to the fourth embodiment.

FIG. 12 is a schematic diagram relating to an operation of the control unit 101 detecting the largest image shift amount of a subject. The horizontal axis indicates the frame number of a moving image or still images that are captured in time series, and the vertical axis indicates the image shift amount detected in a tile that corresponds to a subject to be tracked. In this embodiment, the largest absolute value of the image shift amount of the subject from the current frame to the third frame prior to the current frame (from the frame number n to the frame number n−3 in FIG. 12) is detected as the largest image shift amount. However, for example, an average image shift amount between the latest several frames may alternatively be used. Accordingly, in the example in FIG. 12, the largest image shift amount is two pixels. Note that the signs of the image shift amount indicate image shift directions. For example, if the shift direction is the horizontal direction, the horizontal rightward direction and the horizontal leftward direction may be a positive direction and a negative direction, respectively.

In this embodiment, the encoding method is changed in accordance with the largest image shift amount (estimated blurring amount) of a subject. Note that the largest image shift amount of a subject can be detected using at least a predetermined pair of parallax images, out of the plurality of parallax images. The largest value of the image shift amounts detected in a plurality of pairs may alternatively be the largest image shift amount. Specifically, any of the encoding methods described in the first to third embodiments is performed if the largest image shift amount is smaller than or equal to a threshold (i.e. is a second amount), and a conventional encoding method is performed if the largest image shift amount exceeds the threshold (first amount). Here, the encoding methods described in the first to third embodiments are collectively called a level-1 transmission mode, or a first mode. The conventional encoding method is called a conventional transmission mode, or a second mode.

The conventional encoding method refers to a method of also encoding data of all sub-bands for the difference images. More specifically, in the image compression unit 203 shown in FIG. 3, the wavelet transform units 522, 532, and 542 output all sub-band coefficients including the scaling coefficient (II) to the encoding units 523, 533, and 543, respectively. The encoding units 523, 533, and 543 then encode all sub-band coefficients.

Figure 13A:
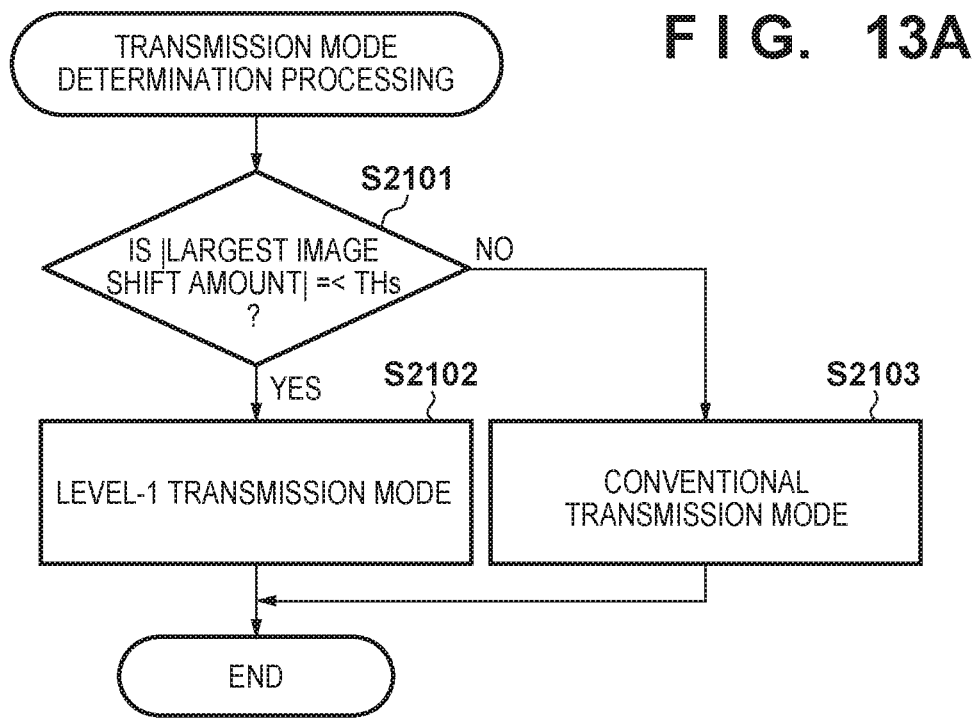
FIGS. 13A and 13B are flowcharts relating to an operation according to the fourth embodiment.

In the conventional transmission mode, the amount of encoded data cannot be reduced, but all sub-bands can be used during refocusing, and accordingly, the area in which focus can be adjusted through refocusing is wider than that in the level-1 transmission mode in which the scaling coefficient (LL) is not used. Accordingly, as illustrated in the flowchart in FIG. 13A, if the largest image shift amount of a subject to be tracked exceeds the threshold (S2101, NO), i.e. if it is conceivable that a blur of the subject is large, the control unit 101 selects the conventional transmission mode (S2103). On the other hand, if the largest image shift amount of a subject to be tracked is smaller than or equal to the threshold (S2101, YES), i.e. if it is conceivable that a blur of the subject is small, the control unit 101 selects the level-1 transmission mode (S2102) to reduce the amount of encoded data. The processing illustrated in FIG. 13A can be performed for each tile during the encoding.

Thus, whether to perform encoding while giving priority to a reduction in the amount of encoded data or to perform encoding while giving priority to the amount of focus adjustment through refocusing is dynamically selected in accordance with the size of a blur of a subject to be tracked. Accordingly, it is possible to avoid the case of being unable to focus on a subject to be tracked during refocusing although the blurring amount of the subject is large, or the case of generating an excessive amount of encoded data. The control unit 101 can record whether the encoding data is in the level-1 transmission mode or the conventional transmission mode, to a header of a file in association with respective tiles, for example.

Figure 13B:
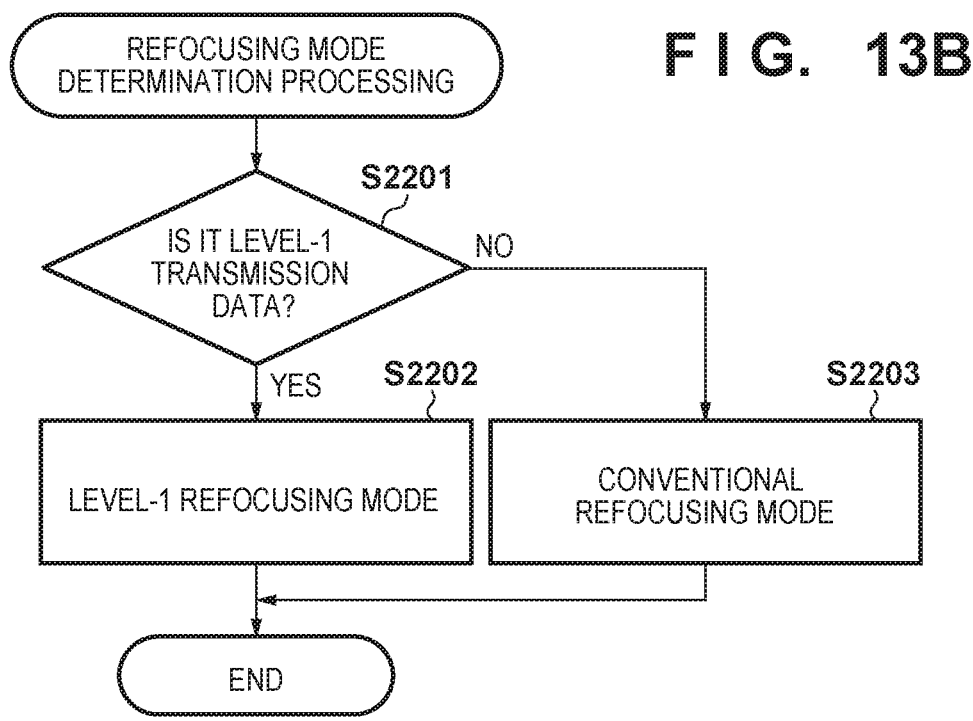

During the decoding, the control unit 101 determines whether the encoded data to be decoded is encoded data in the level-1 transmission mode or encoded data in the conventional transmission mode, and changes the decoding method to be used in the image processing unit 107 in accordance with the determination result. Specifically, as illustrated in the flowchart in FIG. 13B, if the encoded data of the tile to be decoded is encoded data in the level-1 transmission anode (S2201, YES), the control unit 101 determines to use a level-1 refocusing mode (S2202). If the encoded data of the tile to be decoded is encoded data in the conventional transmission mode (S2201, NO), the control unit 101 determines to use a conventional refocusing mode (S2203), The control unit 101 notifies the image processing unit 107 of the determined refocusing mode. The processing illustrated in FIG. 13B can be performed for each tile.

The image processing unit 107 performs decoding and restoration as described in the first embodiment using FIG. 7A, for tiles regarding which the image processing unit 107 has been notified of the level-1 refocusing mode. On the other hand, as for tiles regarding which the image processing unit 107 has been notified of the conventional refocusing mode, all of the sub-band coefficients are also decoded by the decoding units 821, 831, and 841, and accordingly, the inverse wavelet transform units 822, 832, and 842 also perform inverse wavelet transform using all of the sub-band coefficients. Note that the decoding unit 801 supplies all of the sub-band coefficients to the inverse wavelet transform unit 812, and sets all sub-band coefficients to be supplied to the inverse wavelet transform unit 802 to 0. Also, all pixel values of the predicted image PREV_L(n) are set to 0. That is to say, since the input ADD_L(n) to the adder unit 804 is an image with all pixel values being 0, the refocused image generated by the shift-and-add operation unit 803 is the ultimate refocused image as-is.

Note that, in this embodiment, the decomposition level of wavelet transform during the encoding is 1, in order to simplify description and facilitate understanding. However, the decomposition level may be selected from two or more decomposition levels. The higher the decomposition level, the more finely the level of the wavelet expansion coefficients of the difference images can be controlled, and accordingly, the amount of encoded data can be controlled finely.

For example, in the case of performing wavelet transform at up to decomposition level 3, the control unit 101 sets the threshold for the largest image shift amount to THs1 to THs3 (THs1>THs2>THs3), and determines to use the conventional transmission mode if largest image shift amount exceeds the threshold THs1. If the largest image shift amount is smaller than or equal to THs1 and is greater than THs2, the control unit 101 determines to use the level-3 transmission mode in which the wavelet expansion coefficients of the difference images are transmitted at up to decomposition level 3. If the largest image shift amount is smaller than or equal to THs2 and is greater than THs3, the control unit 101 determines to use the level-2 transmission mode in which the wavelet expansion coefficients of the difference images are transmitted at up to decomposition level 2. If the largest image shift amount is smaller than or equal to THs3, the control unit 101 determines to use the level-1 transmission mode. By thus using two or more decomposition levels and thresholds for the image shift amount, the amount of encoded data can be controlled more finely.

In this embodiment, the largest absolute value of the image shift amount between a predetermined number of latest frames is the largest image shift amount. However, the largest image shift amount may be estimated using another method, for example, by using the largest image shift amount of the next or subsequent frames that is estimated by means of machine learning, with the history of image shift amount serving as the input in the machine learning.

According to this embodiment, the amount of encoded data is controlled in accordance with a blurring amount of a subject to be tracked, and it is therefore possible to record encoded data of multi-viewpoint images with an amount of encoded data that is appropriate for the blurring amount.

Other Embodiments

The above first to fourth embodiments can be partially or entirely combined, as appropriate. The first to fourth embodiments have described configurations in which the image capture unit performs sub-band division, encoding, and so on. However, a configuration may alternatively be employed in which the image capture unit performs processing up to A/D conversion, and the control unit or the image processing unit performs sub-band division, encoding, and so on. Also, sub-band division, encoding, and so on in the first to fourth embodiments may not necessarily be performed when an image is captured. For example, the effect of reducing the recording size can also be achieved by performing such processing to RAW data that is already recorded. The first to fourth embodiments have a configuration in which encoding and decoding are performed by the same apparatus, but encoding and decoding may alternatively be performed by different apparatuses. The present invention is not limited to the configurations in the described embodiments. The configurations in the embodiments can be modified and changed in various manners within the scope described in the claims, and all such modifications and changes are included in the present invention.

The above embodiments have a configuration in which the image compression unit and the pixel units are provided in the same semiconductor chip. However, a configuration may alternatively be employed in which a chip for image capturing that includes a pixel unit and a circuit such as an FPGA (field-programmable gate array) that includes the image compression unit are provided independently, and are electrically connected to each other through wiring. In this case, the output from the image compression unit is directed to an image processing unit that is mounted in yet another chip, for example.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-214188, filed on Nov. 6, 2017, which is hereby incorporated by reference herein in its entirety.

What is claimed is:

1. An image processing apparatus comprising:
   a processor that executes a program stored in a memory and functions as:
   a dividing unit configured to divide a plurality of first difference images that are based on addition and subtraction of a plurality of parallax images, and a second difference image between a current composite image that is based on addition of the plurality of parallax images and a past composite image, into a plurality of sub-bands including a sub-band that includes high-frequency components and a sub-band that does not include high-frequency components; and
   an encoding unit configured to encode the plurality of first difference images and the second difference image,
   wherein, as for the plurality of first difference images, the encoding unit encodes data of the sub-band that includes high-frequency components, and, as for the second difference image, the encoding unit encodes data of the plurality of sub-bands.

2. The image processing apparatus according to claim 1, the processor
   further functions as:
   a motion detection unit configured to detect a motion vector using the current composite image and the past composite image; and
   a determination unit configured to determine a quantization step to be used by the encoding unit, based on the motion vector.

3. The image processing apparatus according to claim 2, wherein, if a blur of a subject in an area to be encoded exceeds a threshold, the determination unit determines the quantization step that is larger than the quantization step in a case where the blur of the subject is smaller than or equal to the threshold.

4. The image processing apparatus according to claim 3, wherein, if an amount of subject movement based on the magnitude of a motion vector of the area to be encoded is larger than the diameter of a permissible circle of confusion of an image capture apparatus that is used to acquire the plurality of parallax images, the determination unit determines that the blur of the subject in the area to be encoded exceeds the threshold.

5. The image processing apparatus according to claim 4, wherein, if the blur of the subject in the area to be encoded exceeds the threshold, the determination unit determines the quantization step so that the quantization step for a second amount of subject movement, which is larger than a first amount of subject movement, is larger than the quantization step for the first amount of subject movement.

6. The image processing apparatus according to claim 3, wherein, if the blur of the subject in the area to be encoded exceeds the threshold, the determination unit determines the quantization step so that the quantization step to be used in the encoding of the plurality of first difference images is larger than or equal to the quantization step to be used in the encoding of the second difference image.

7. The image processing apparatus according to claim 2, wherein the determination unit determines the quantization step so that the quantization step in a case where variance of motion vectors with respect to the area to be encoded takes a second value, which is larger than a first value, is larger than the quantization step in a case where the variance takes the first value.

8. The image processing apparatus according to claim 2, wherein the determination unit determines the quantization step so that the quantization step to be used in encoding of an area to be encoded where it is estimated that an effect of fine focus adjustment through refocusing is small is larger than the quantization step to be used in encoding of an area to be encoded where it is not estimated that the effect of the fine focus adjustment is small.

9. The image processing apparatus according to claim 1, the processor further functions as:
a scene change detection unit configured to detect an occurrence of a scene change,
wherein if an occurrence of a scene change has been detected regarding the current composite image, an image with all pixel values being 0 is used as the past composite image.

10. The image processing apparatus according to claim 9, the processor further functions as:
a motion detection unit configured to detect a motion vector based on the current composite image and the past composite image,
wherein the scene change detection unit detects an occurrence of the scene change based on the motion vector.

11. The image processing apparatus according to claim 10,
wherein the scene change detection unit detects an occurrence of the scene change based on accumulation of the motion vector of a specific subject.

12. The image processing apparatus according to claim 1,
wherein the encoding unit has
a first mode in which, as for the plurality of first difference images, the encoding unit encodes the data of the sub-band that includes high-frequency components, and, as for the second difference image, the encoding unit encodes the data of the plurality of sub-bands, and
a second mode in which the encoding unit encodes the data of the sub-band that includes high-frequency components of both the plurality of first difference images and the second difference image, and
the processor further functions as:
an image shift amount detection unit configured to detect an image shift amount between parallax images, regarding at least a pair of parallax images out of the plurality of parallax images; and
a control unit configured to control the encoding unit so as to perform the encoding in the second mode if the image shift amount is a first amount, and perform the encoding in the first mode if the image shift amount is a second amount that is smaller than the first amount.

13. The image processing apparatus according to claim 12,
wherein if there are a plurality of decomposition levels of the sub-bands, and the encoding unit is controlled so as to perform the encoding in the first mode, the control unit controls the encoding unit, regarding the first difference images, so that
the encoding unit encodes a coefficient at up to a second decomposition level if the image shift amount is a third amount, and
the encoding unit encodes a coefficient at up to a first decomposition level, which is lower than the second decomposition level, if the image shift amount is a fourth amount that is smaller than the third amount.

14. An image processing apparatus comprising:
a processor that executes a program stored in a memory and functions as:
an acquisition unit configured to acquire first encoded data obtained by encoding a plurality of sub-bands, and second encoded data obtained by encoding a sub-band that includes high-frequency components, out of the plurality of sub-bands, wherein the plurality of sub-bands, including the sub-band that includes high-frequency components and a sub-band that does not include high-frequency components, are obtained by dividing a plurality of first difference images that are based on addition and subtraction of the plurality of parallax images, and a second difference image between a current composite image that is based on addition of the plurality of parallax images and a past composite image;
a first addition unit configured to add a composite image that was restored in the past to encoded data of a sub-band that does not include high-frequency components, out of the first encoded data, to restore a composite image;
a second addition unit configured to add a composite image that was restored in the past to encoded data of a sub-band that includes high-frequency components, out of the first encoded data, to restore a composite image;
a restoration unit configured to restore the plurality of parallax images, using the composite image restored by the second addition unit and the plurality of difference images restored using the second encoded data;
a generation unit configured to generate a refocused image using the plurality of restored parallax images; and
a third addition unit configured to add the refocused image to the composite image that has been restored by the first addition unit.

15. The image processing apparatus according to claim 14, further comprising:
a storage device that stores the composite image restored by the first addition unit as the composite image that was restored in the past and is used by the first addition unit, and storing the composite image restored by the second addition unit as the composite image that was restored in the past and is used by the second addition unit.

16. The image processing apparatus according to claim 14,
wherein the generating unit generates the refocused image by performing a shift-and-add operation on the plurality of restored parallax images.

17. The image processing apparatus according to claim 14,
wherein, if the first encoded data and the second encoded data are subjected to inter-frame prediction encoding using a reset predicted image, the first addition unit and the second addition unit use a reset image as the composite image that was restored in the past.

18. The image processing apparatus according to claim 17,
wherein the reset image is an image with all pixel values being 0.

19. An image capture apparatus comprising:
an image sensor that receives a light beam from an optical system and outputs a plurality of parallax images;
an image processing apparatus that applies encoding processing to the plurality of parallax images output from the image sensor to generate encoded data; and
a recording unit configured to record, to a memory, the encoded data that has been generated by the image processing apparatus,
wherein the image processing apparatus comprising:
a processor that executes a program stored in a memory and functions as:
a dividing unit configured to divide a plurality of first difference images that are based on addition and subtraction of the plurality of parallax images, and a second difference image between a current composite image that is based on addition of the plurality of parallax images and a past composite image, into a plurality of sub-bands including a sub-band that includes high-frequency components and a sub-band that does not include high-frequency components; and an encoding unit configured to encode the plurality of first difference images and the second difference image, wherein, as for the plurality of first difference images, the encoding unit encodes data of the sub-band that includes high-frequency components, and, as for the second difference image, the encoding unit encodes data of the plurality of sub-bands.

20. The image capture apparatus according to claim 19, further comprising:

an image processing circuit configured to decode the encoded data that has been generated by the encoding unit and recorded to the memory, and perform image processing using parallax between the plurality of first images.

21. An image sensor comprising:

a first semiconductor substrate comprising a plurality of photoelectric conversion units that receive a light beam from an optical system and output a plurality of parallax images; and a second semiconductor substrate comprising an image processing apparatus that applies encoding process to the plurality of parallax images to generate encoded data, wherein:

the first semiconductor substrate and the second semiconductor substrate being stacked together, and the image processing apparatus comprising:

a processor that executes a program stored in a memory and functions as:

a dividing unit configured to divide a plurality of first difference images that are based on addition and subtraction of the plurality of parallax images, and a second difference image between a current composite image that is based on addition of the plurality of parallax images and a past composite image, into a plurality of sub-bands including a sub-band that includes high-frequency components and a sub-band that does not include high-frequency components; and an encoding unit configured to encode the plurality of first difference images and the second difference image, wherein, as for the plurality of first difference images, the encoding unit encodes data of the sub-band that includes high-frequency components, and, as for the second difference image, the encoding unit encodes data of the plurality of sub-bands.

22. An image processing method to be performed by an image processing apparatus, the method comprising:

dividing a plurality of first difference images that are based on addition and subtraction of a plurality of parallax images, and a second difference image between a current composite image that is based on addition of the plurality of parallax images and a past composite image, into a plurality of sub-bands including a sub-band that includes high-frequency components and a sub-band that does not include high-frequency components; and encoding the plurality of first difference images and the second difference image, wherein, during the encoding, as for the plurality of first difference images, data of the sub-band that includes high-frequency components is encoded, and, as for the second difference image, data of the plurality of sub-bands is encoded.

23. An image processing method to be performed by an image processing apparatus, the method comprising:

acquiring first encoded data obtained by encoding a plurality of sub-bands, and second encoded data obtained by encoding a sub-band that includes high-frequency components, out of the plurality of sub-bands, wherein the plurality of sub-bands, including the sub-band that includes high-frequency components and a sub-band that does not include high-frequency components, are obtained by dividing a plurality of first difference images that are based on addition and subtraction of the plurality of parallax images, and a second difference image between a current composite image that is based on addition of the plurality of parallax images and a past composite image;

adding a composite image that was restored in the past to encoded data of a sub-band that does not include high-frequency components, out of the first encoded data, to restore a composite image;

adding a composite image that was restored in the past to encoded data of a sub-band that includes high-frequency components, out of the first encoded data, to restore a composite image;

restoring the plurality of parallax images, using the composite image that has been restored as a result of the adding of the composite image that was restored in the past to the encoded data of the sub-band that includes high-frequency components, and the plurality of difference images that have been restored using the second encoded data;

generating a refocused image using the plurality of restored parallax images; and adding the refocused image to the composite image that has been restored as a result of the adding of the composite image that was restored in the past to the encoded data of the sub-band that does not include high-frequency components.

24. A non-transitory computer-readable medium storing a command that can be executed by a computer, the command, upon being executed by the computer, causing the computer to function as an image processing apparatus comprising:

a dividing unit configured to divide a plurality of first difference images that are based on addition and subtraction of a plurality of parallax images, and a second difference image between a current composite image that is based on addition of the plurality of parallax images and a past composite image, into a plurality of sub-bands including a sub-band that includes high-frequency components and a sub-band that does not include high-frequency components; and an encoding unit configured to encode the plurality of first difference images and the second difference image, wherein, as for the plurality of first difference images, the encoding unit encodes data of the sub-band that includes high-frequency components, and, as for the second difference image, the encoding unit encodes data of the plurality of sub-bands.

* * * * *